United States Patent [19]
Orshansky, Jr.

[11] 3,888,139
[45] June 10, 1975

[54] HYDROMECHANICAL TRANSMISSION

[75] Inventor: Elias Orshansky, Jr., San Francisco, Calif.

[73] Assignee: Orshansky Transmission Corporation, New York, N.Y.

[22] Filed: Sept. 25, 1972

[21] Appl. No.: 291,803

Related U.S. Application Data

[63] Continuation-in-part of Ser. No. 259,549, June 5, 1972, which is a continuation-in-part of Ser. No. 154,976, June 21, 1971, abandoned.

[52] U.S. Cl. .................................. 74/687; 74/681
[51] Int. Cl. .......................................... F16h 47/04
[58] Field of Search ............ 74/687, 681, 686, 688, 74/689, 690

[56] References Cited
UNITED STATES PATENTS

| | | | |
|---|---|---|---|
| 2,504,040 | 4/1950 | Orshansky, Jr. .................. | 74/687 X |
| 2,580,946 | 1/1952 | Orshansky, Jr. .................. | 74/687 |
| 2,931,250 | 4/1960 | Ebert ............................... | 74/687 |
| 3,079,813 | 3/1963 | Quigley ........................... | 74/687 |
| 3,455,183 | 7/1969 | Orshansky, Jr. .................. | 74/687 |
| 3,596,535 | 8/1971 | Polak ............................... | 74/687 X |
| 3,675,507 | 7/1972 | Takekawa ........................ | 74/687 |

Primary Examiner—Samuel Scott
Assistant Examiner—John Reep
Attorney, Agent, or Firm—Owen, Wickersham & Erickson

[57] ABSTRACT

A power transmission. Two planetary gear trains each having its own carrier and its own planet, sun, and ring gears, each providing an input member, an output member, and a reaction member. The input member of one gear train is connected to an input means, and the two input members of the two gear trains are interconnected so that both are driven by the input means. The reaction members of the two gear trains are also interconnected. The output members of the two gear trains are separately clutchable to an output means, and speed varying means cause one output member to increase its speed and simultaneously cause the other output member to decrease its speed, and vice versa. The speed varying means may comprise a pair of hydraulic units hydraulically interconnected so that one serves as a pump while the other serves as a motor and vice versa, one of the units being connected in driving relation to the input means, and the other being connected in driving relation to the reaction members.

49 Claims, 16 Drawing Figures

INVENTOR.
ELIAS ORSHANSKY, JR.

HYDROMECHANICAL TRANSMISSION

CROSS-REFERENCE TO RELATED APPLICATION

This application is a continuation-in-part of application Ser. No. 259,549 filed June 5, 1972, which was a continuation-in-part of application Ser. No. 154,976 filed June 21, 1971, now abandoned.

BACKGROUND OF THE INVENTION

This invention relates to a hydromechanical infinitely variable transmission. It provides for improved utilization of vehicle engine power by enabling the engine to operate within a narrow speed range which has been optimized for minimum emissions, maximum fuel economy and maximum power, regardless of vehicle operating conditions.

When utilizing conventional torque converter or manual transmission, many compromises are imposed upon the engine because it must provide adequate performance over a wide range of torque and speed. The practice of most vehicle manufactures of providing a selection of optional axle ratios for the vehicle is only one of the many attempts which have been made to reduce the compromise for any given application.

With an infinitely variable transmission, the engine can always be operated in a speed range in which it is capable of producing rated power. Therefore, vehicle performance in any given application can be maintained or even improved while utilizing a smaller engine. However, infinitely variable transmissions of the pure hydrostatic type are limited to applications where significant power losses can be tolerated in return for the benefits of improved transmission ratio control.

Hydromechanical transmissions offer the control benefits of a hydrostatic transmission, and, since only a portion of the engine power is transmitted by the hydraulic units, they provide a means of removing the performance barrier of excessive power losses. The extent to which any hydromechanical transmission can accomplish this is a function of the percentage of power which must be transmitted hydraulically.

The transmission of this invention can transmit high horsepower over a wide range of output speed variation at a constant input speed and horsepower. It is a planetary-hydraulic device which differs from the previous transmissions in its ability to transmit power over a wide range with a minimum of transmitted hydraulic horsepower, and a minimum of installed hydraulic horsepower. It provides full engine braking over its entire range of operation.

The invention avoids the pitfalls of excessive complexity, speeds or loads in the gear train. Maximum reliability and minimum cost have been obtained by utilizing standard commercial hydraulic units which are operated totally within their long-life rated conditions of speed and power. In addition, the clutches can utilize the same low-cost paper elements presently employed in high production automobile torque converter transmissions. For a comparable power rating, a smaller number of elements than in a torque converter power shift transmission can be utilized, because at all shift points the clutch elements are virtually synchronous. The number of elements is, therefore, a function not of their thermal capacity, but of their steadystate torque capacity.

Among the fields of applications of the transmission of this invention are passenger and competition cars, highway and off-highway trucks, buses, agricultural and construction equipment, military vehicles, and industrial drives and machine tools.

The invention makes it possible to design transmissions of an extremely wide range of speed and torque variation at full power. This is required in construction and off-highway equipment, for example, where torque multiplication of the order of 18:1 and 24:1 may be encountered. Machine tool drives may require even wider ranges, and they are possible.

The use of this transmission in a piston engine vehicle enables reduction of exhaust emissions and improvement in the specific fuel consumption by programming the engine to operate within its optimum range under all road conditions without regard to transmission torque output requirements. Both the NOx and CH emissions can be minimized by optimizing the engine for operation in a specific narrow range. In addition, a smaller engine may be utilized for any application, as the transmission enables full engine power to be developed at any vehicle speed except for the lower speeds where the vehicle is traction limited. It is particularly desirable to operate turbocharged diesel engines in a narrow range of speed.

The same considerations listed for piston engines also apply to rotary combustion chamber engines. The benefit in reduction of CH emissions is of a much greater magnitude, however, due to the high rate of change in emission characteristics for rotary combustion engines with respect to engine speed.

The benefits to be derived from the application of this transmission to a gas turbine are also significant. Manufacturing cost is a major drawback in producing a turbine today. This, to a large degree, is a function of the complexity required in the design of a turbine for use under the varying torque and speed conditions of a road vehicle. With the hydromechanical transmission of this invention, the turbine can be programmed to operate only under those conditions during which it is most efficient. Therefore, a single-shaft turbine becomes feasible, as it is more economical to manufacture than the two-shaft design normally proposed for vehicle application. Since constant speed operation is feasible, the problems in connection with the throttle response time of a turbine do not arise. Because there is an infinite variation in speed and torque in the transmission, and no interruption of power flow occurs at any time, the turbine is never unloaded.

SUMMARY OF THE INVENTION

A family of transmission is provided, all having the same basic combination.

The power transmission includes in combination with input means and output means, two planetary gear trains each having its own carrier and its own planet, sun, and ring gears, to provide an input member, an output member and a reaction member. The input member of one gear train is connected to the input means, and the input members of the two gear trains are interconnected so that both are driven by the input means. The reaction members of the two gear trains are interconnected, and their output members are separately clutchable to the output means. Speed varying means cause one output member to increase its speed and simultaneously cause the other side output member to decrease its speed, and vice versa, in a given range, for preparation for driving in the next range. The speed varying means preferably comprises a pair of hydraulic units hydraulically interconnected so that one serves as a pump while the other serves as a motor and vice versa, one unit being connected in driving relation to the input means, and the other being connected in driving relation to the reaction members. The ratio of maximum speed of one output member to its minimum speed is the same as for the other output member, and is the same in each range. Thus each range, no matter how many are used, drives the output through an identical speed and torque ratio.

A feature of a preferred embodiment of this basic combination is a planetary assembly having two carriers, two sets of planet gears, two sun gears, and two ring gears. The two sun gears are mounted on the same reaction shaft. A first carrier serves as an input to the assembly, and the second carrier serves as one of two output members, the other one being the ring gear driven by the planets on the first carrier. The second ring gear serves as an input to the second part of the planetary assembly, and is splined to the first carrier. Clutches enable an output shaft to be clutched to either the second carrier or to the first ring gear, with an overlap where they are at the same speed.

The input shaft is clutchable, through a gear train, to the first carrier and it also drives a variable-displacement hydraulic unit with hydraulically drives a fixed-displacement hydraulic unit, and this latter unit is connected by a gear train to the reaction shaft. Also, through clutch means, the hydraulic units are used in hydrostatic state for starting and for reverse operation.

The above combination gives a two-range hydromechanical operation, in addition to a hydrostatic start and reverse. A three-range hydromechanical operation can be achieved by adding a reduction planetary assembly beyond the main planetary assembly, with a third clutch serving to clutch one of the gears of the reduction assembly to a stationary housing. The reduction planetary assembly may be provided with two stages and two clutches to provide a four-range hydromechanical transmission in addition to the hydrostatic start and reverse.

The family of transmission of this invention uses a variable ratio hydromechanical assembly, which may go through its cycle of speed and torque variation two, three, or four times, depending on the required total torque multiplication range and the horsepower to be transmitted. The start and reverse ranges employ hydrostatic operation.

The cost reduction can be substantial by using the same variable assembly in many different applications. For example, the truck transmissions are shown as having three ranges, if approximately an 8:1 total reduction range is required. Four ranges may be used if, with the same variable assembly, a reduction range of 16:1 is desired. Similarly, a two-range transmission, again using the same variable assembly, may be used for application where the speed variation range or the input horsepower need not be too great. Thus, it is possible to encompass a number of applications from farm tractors and construction equipment to highway and off-highway trucks using a large number of identical components.

The transmissions use the same variable planetary assembly, and differ only in whether there are range shifts beyond the output of the variable planetary, and, if so, how many. The range shifts occur at synchronized speeds, without interruption of power flow on either the upshift or the downshift. The starting and reverse ranges are hydrostatic and are not considered part of the working ranges. In most cases, the starting and reverse ranges operate at constant torque, rather than at constant horsepower, since maximum torque is limited by either maximum pressure or traction. The working ranges are considered those which operate at full and constant horsepower.

Hydromechanical transmissions have characteristics which are different from both gear boxes and torque converter transmissions. Since hydromechanical transmissions develop full static torque while at "stall," the engine needs to develop only the horsepower necessary to make up the transmission losses. This is considerably less horsepower than that required to develop stall torque in a torque converter transmission.

However, since this horsepower is a dead loss, with the vehicle standing still, the amount of heat developed is greater than the average heat rejection requirement when operating in the full horsepower ranges. Therefore, one of three methods of protecting against excessive temperature rise must be used as described in the immediately following paragraphs.

a. Transmission may have such a wide ratio as to exceed the traction limit in torque requirement.

b. Controls may be provided to either unload the hydraulic system if torque capacity of the transmission has been exceeded or limit the engine input.

c. A large enough heat exchanger capacity has to be supplied.

The transmissions described all have a hydrostatic starting range in addition to the split power hydromechanical ranges; i.e., the four-range transmission has four split power ranges and a hydrostatic starting range. The ratio from top speed to bottom speed of a range and the number of ranges determine the hydraulic unit power requirement and the maximum hydraulic pressure for a given configuration. For any combination of vehicle gearing, weight and power, there exists an optimum transmission configuration which is capable of slipping the drive wheels without overpressuring the hydraulic units and which will allow delivery of full engine horsepower at speeds above the vehicle traction limit without exceeding the horsepower limitation of the hydraulic units.

In many applications, it may be more practical not to include the capability of slipping the tires at their maximum load. In this case, maximum transmission output torque may be limited by relief valve setting or by some other controls device. Also, hydraulic unit size can be reduced while not reducing transmission horsepower capacity.

The hydraulic unit requirement in the hydrostatic range is a function of vehicle speed at the beginning of the first split power range. For example, if the transmission can transmit only 50 percent of maximum engine power because of traction limitations, the hydraulic unit requirement in the hydrostatic range need be only 50 percent of the engine capability. Similarly, the maximum power which can be transmitted in the hydrostatic range for such a particular transmission may be full engine horsepower.

Although hydraulic requirements in the hydrostatic range decrease with decreasing shift point speed, the requirement in the split power ranges increases in proportion to the ratio per range. This is shown by the amount of hydraulic power transmitted in the hydromechanical ranges. Therefore, the initial shaft point speed and the ratio per range are chosen to optimize the maximum horsepower and pressure requirements in both the hydrostatic range and in the split power ranges.

In other words, a hydromechanical range of wider spread then required by torque multiplication at constant horsepower is used to reduce the hydraulic horsepower and pressure requirement in the hydrostatic range, at some expense of greater percentage of power transmitted hydraulically in the hydromechanical ranges.

A hydromechanical transmission is dependent on the hydraulic components for its torque multiplication, and therefore the engine is not required to operate at a torque rise in a reduced speeds. The engine may be operated at constant speed which could afford a savings by simplification of the engine fuel-governor system.

Other objects and advantages of the invention will appear from the following description of some preferred embodiments.

DETAILED DESCRIPTION OF PREFERRED EMBODIMENTS

A Two-Range Transmission (FIGS. 1–4)

Figure 1:
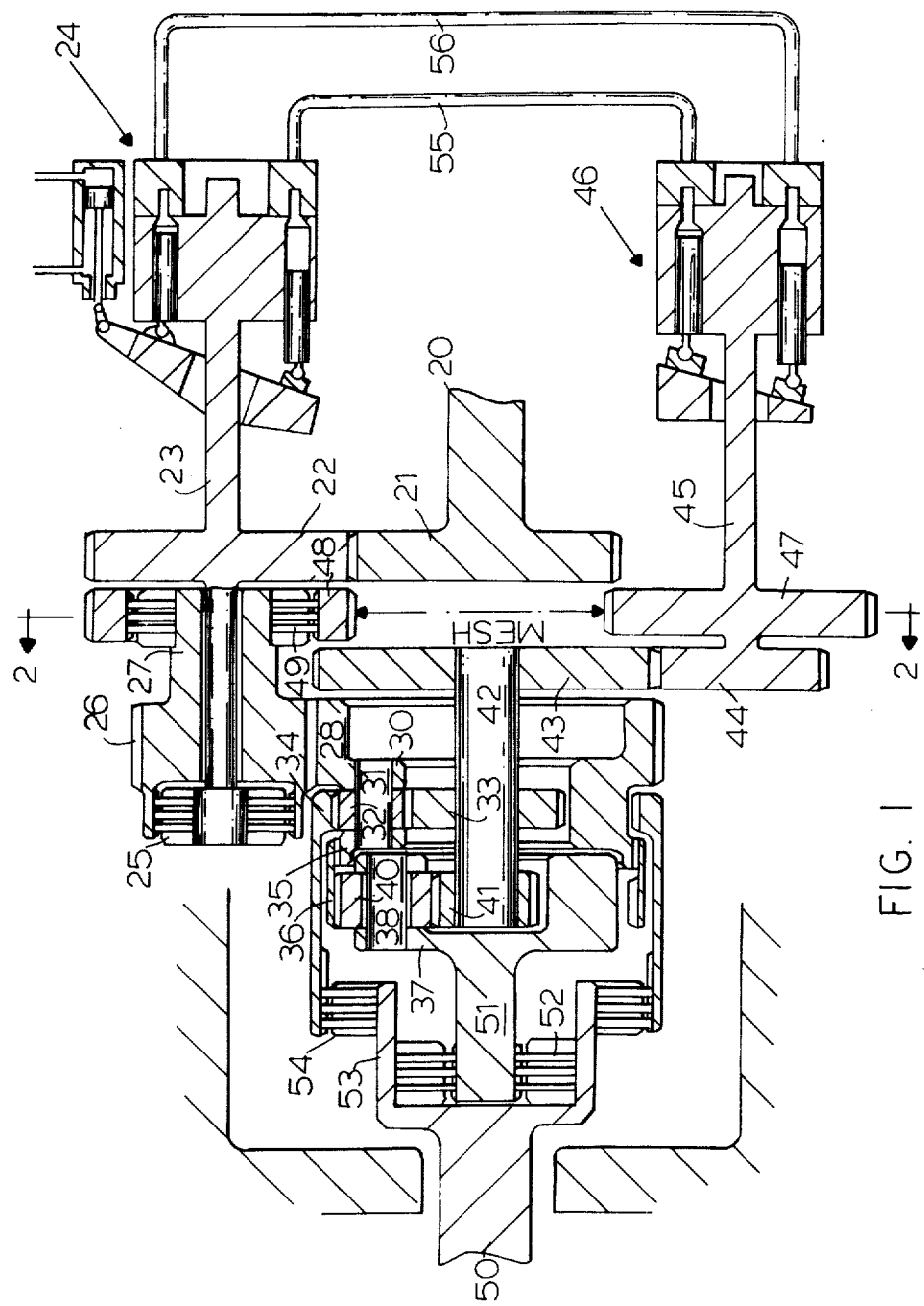
FIG. 1 is a sectional view of a two-stage transmission embodying the principles of the invention, and transmission being partially spread out so that the meshing of two gears does not show.
Figure 2:
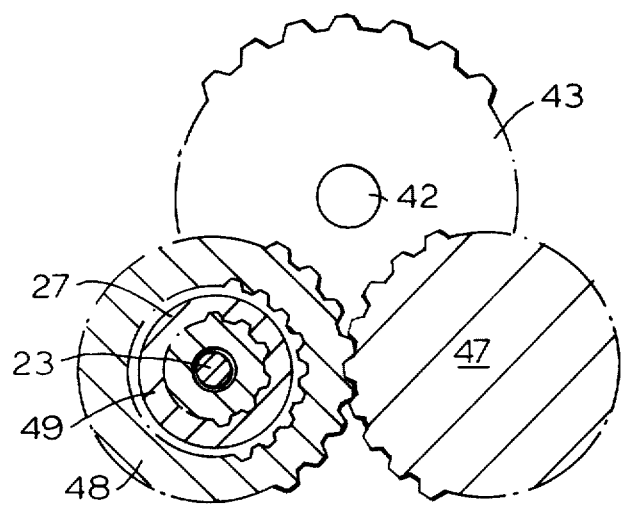
FIG. 2 is a view in section along the line 2—2 in FIG. 1, (and also in FIG. 8) to show how the gears actually mesh.

An input shaft 20 carries an input gear 21 which meshes with a gear 2 on a shaft 23. The shaft 23 drives a variable displacement hydraulic unit 24 and is also connected to one portion ofa clutch 25. The other portion of the clutch 25 is integral with a gear 26, which has a hub 27. The gear 26 drives a gear 28, which is, operationally, at least, a part of a first planetary carrier 30 that is the input member of a variable speed planetary assembly.

The carrier 30 carries on pins 31 a set of planet gears 32, which mesh with both a first sun gear 33 and a first ring gear 34. The carrier 30 continues on to form spline teeth 35 which mesh with a second ring gear 36, which rotates at the same speed as and together with the carrier 30 and the gear 28, and this second ring gear 36 is the input into the secondary part of the variable speed planetary assembly.

The secondary part of the planetary assembly includes a second carrier 37 which carries pins 38 on which are mounted planet gears 40. These planet gears 40 mesh with the ring gear 36 and also with a second sun gear 41, which is integral with or securely in driving connection with a shaft 42, as is the gear 33, which meshes with the planetary pinions 32 of the first part of the planetary assembly. Thus these two sun gears 33 and 41, which are reaction gears, rotate at the same speed and are really one member except for constructional reasons, while the two inputs which are the carrier 30 and the second ring gear 36 are also really one member except for constructional reasons, and they rotate at the same speed.

This unusual planetary assembly has the advantages (1) that there are very low gear loadings, (2) that there are very low bearing loadings, (3) that the pinions 32 and 40 do not have to intermesh, (4) that it is much easier to construct than a compound planetary (5) that it is susceptible to simple construction in the reaction members 33 and 41, since they both turn at the same speed and are connected to the common shaft 42, (6) the rotational speeds of the planets do not exceed allowable limits, and (7) and than three planets can be used in each planetary assembly to afford greater power capacity.

This reaction shaft 42 carries gear 43, which is a reaction gear meshing with a gear 44 on a shaft 45 that is connected to a fixed-stroke hydraulic unit 46. The shaft 45 also carries a gear 47 which is meshed with a gear 48 which is clutchable to the shaft 23 by a clutch 49.

The hydraulic unit 24 is variable in stroke and runs at constant speed, driven at all times by the input shaft 20 through the gears 21 and 22 and the shaft 23. The unit 24 is fully variable in stroke in either direction from zero, so that it is capable of reverse operation. The hydraulic unit 46, which is connected to the reaction gears 33 and 41 through the shaft 42, gears 43 and 44 and shaft 45, is fixed in stroke and therefore an over-center operation of the wobble plate of the hydraulic unit 24 results in a change between a forward and a backward rotation of the hydraulic unit 46.

The members of the planetary assembly are driven in a direction depending on the stroking of the hydraulic unit 24, The planetary assembly drives an output shaft 50 through either of two output members, the ring gear 34 and the carrier 37, which may be secured to a shaft 51, all of the shafts 50, 51, 42, and 20 preferably being coaxial, or axially in line with each other. The shaft 51 is connected to the output shaft 50 by clutch 52, and the ring gear 34 is connected to a tubular member 53 on the output shaft by a clutch 54. Shift is made between the clutches 52 and 54 when their speeds are synchronous, with a slight overlap, the clutch 52 driving the output shaft 50 in one range of speed and the clutch 54 driving the output shaft in the other range of speed.

The clutch 49, which connects the gear 48 with the shaft 23 is used for starting and is engaged normally only when the transmission is starting, going either in forward or reverse. At this time, the clutch 25 is disengaged, and the operation is purely hydrostatic. Thus, the input shaft 20 drives the gear 21 which drives the gear 22 to drive the shaft 23 and thus the variable stroke hydraulic unit 24. The unit 24 supplies oil to the fixed-stroke hydraulic unit 46 by means of oil lines 55 and 56, and the hydraulic unit drives the planetary members through the gears 47 and 48, the clutch 49, and the gears 26 and 28, the gear 26 at that time being disconnected from the input shaft due to the disengagement of the clutch 25.

Figure 3:
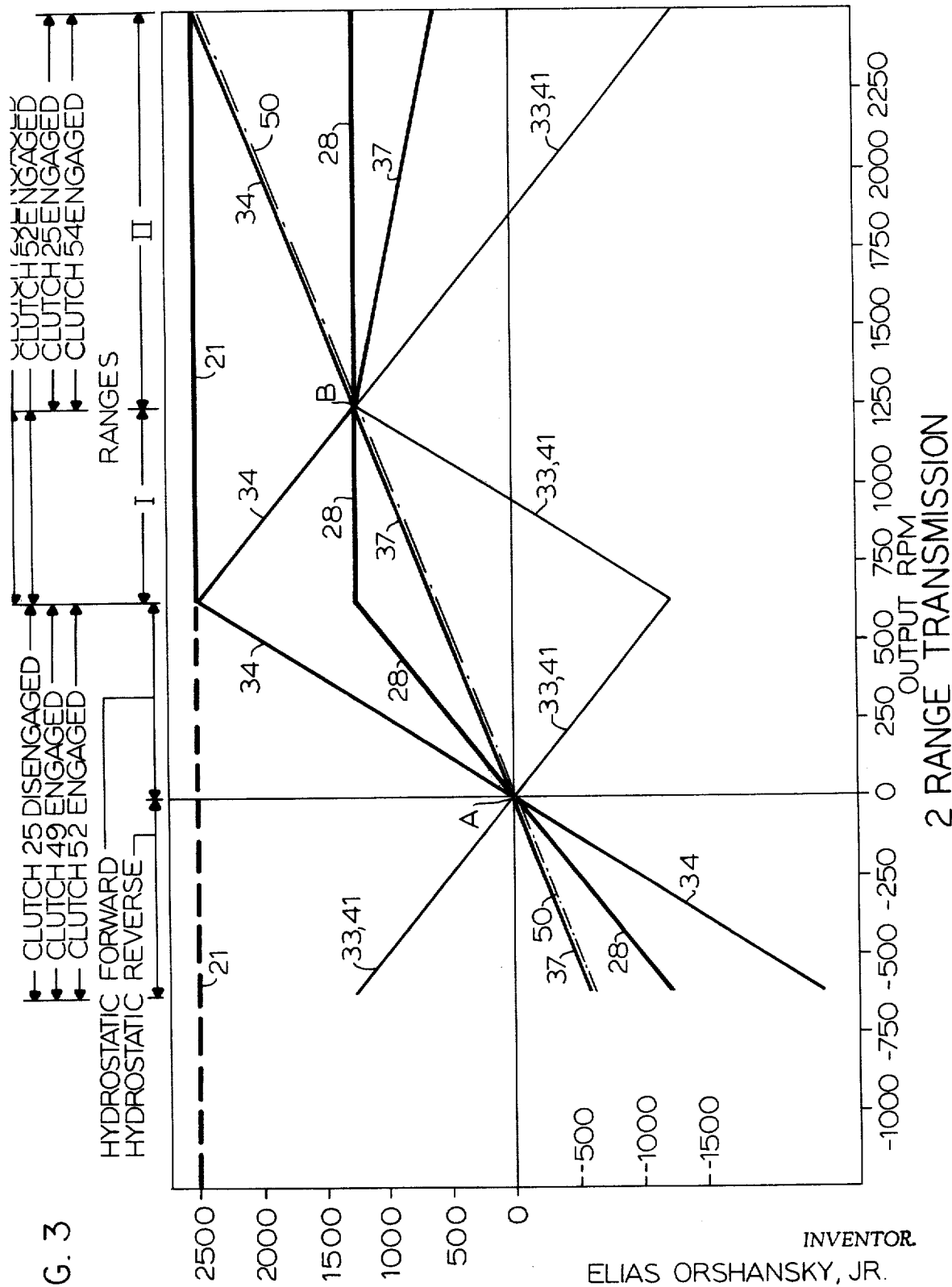
FIG. 3 is a speed lines diagram, with output speeds in r.p.m. being plotted against the speeds of the planetary members in r.p.m. The clutches which are engaged in each range are identified.

In the speed-lines diagram, FIG. 3, various lines have been labeled with the numbers of the gears or shafts of FIG. 1, whose speeds they represent. Thus, the input gear 21 runs at a constant speed, and the broken line at the left end of the hydrostatic range forward indicates that it is not at that time connected to the planetary assembly, because the clutch 25 is than disengaged. Instead, as shown, the clutch 49 is then engaged, and the clutch 52 is also engaged to drive the output shaft 50. During engagement of the clutch 49 the planetary assembly simply acts as a gear reduction train driven by the hydraulic unit 46, which in turn is driven from the input shaft 20 through the gears 21 and 22 and the hydraulic unit 24. Starting from zero stroke of the hydraulic unit 24 at zero speed, stroking it in one direction causes the output shaft 50 to go in reverse and stroking it in the opposite direction causes the output shaft 50 to go forward.

Assuming that the output shaft 50 is going forward, the carrier 37 will be increasing in speed up to the point where it reaches the end of the hydrostatic forward range, i.e., the highest speed in that range. Simultaneously the sun or reaction gears 33 and 41, and therefore the shaft 42 and the gear 43, reach a certain maximum negative speed. The ratios of the gears 43, 44 and 47, 48 are such that at that point it becomes possible to engage the clutch 25 synchronously and, immediately thereafter, to disengage the clutch 49, the ratio between the gears 26 and 28 and the ratio between the gears 21 and 22 being such that at this speed the gear 28 can be connected to the input gear 21. In this case, the ratio is two to one. Thereafter, the gear 26 serves as input into the planetary assembly, and from this time on the transmission is in the hydromechanical state, because the power is transmitted from the input shaft 20 through the gears 21 and 22, the clutch 25 and the gears 26 and 28 and thereafter is delivered through two channels, one hydrostatic and the other mechanical, to the output shaft 50 in a manner which splits the power between the hydraulic and the mechanical power, as is shown in the diagrams, FIG. 4.

At the time of shifting from the hydrostatic range to the first hydromechanical range all the members 28, 33, 34 and 41 are running at different speeds, and the members 33 and 41 are running in a direction opposite to that of the member 34. Therefore, an idler arrangement must be interposed between some of these members in order to adjust their speeds and ratios to conditions such that a clutch may be engaged. This idler arrangement is provided by the gears 47 and 48, which produce the right sense of direction between the gear 43, which is made integral with the gears 41 and 33, and the gear 26, which drives the member 28. Consequently, when clutch 25 is engaged at the point where the hydrostatic range ends and hydromechanical Range I begins, from that point the members 34, 28, 33, 41 and 27 all converge to zero speed.

As the transmission proceeds in Range I of this hydromechanical state, which it has just entered, it will be noted that the speeds of all the planetary members, which converged at starting at one synchronous point A, again converge at one synchronous point B where the operation is shifted from Range I to Range II by engaging the clutch 54 and disengaging the clutch 52. The operation for Range I consists of one planetary member, the carrier 37, increasing its speed, while another planetary member, the ring gear 34, is decreasing its speed, and that the ratios between the maximum and minimum speeds for each of the members 37 and 34 are identical, for example, two to one. The function of increasing one planetary member through a given ratio while at the same time decreasing the other planetary member through the same ratio without driving anything until it reaches a synchronous point with the first member and can thereafter accept the drive, this function is a vital point of this hydrostatic transmission and this equality of ranges is novel. Furthermore, this equality of ranges can extend over more than the two ranges shown in this embodiment, in fact it can extend over any number of ranges. When this equality of speeds is reached at the end of Range I, the members carrying the clutches 52 and 54 are synchronous, and therefore a shift can be made from the clutch 52 to the clutch 54 with a desirable overlap to avoid loss of power transmission but without any significant relative speed of the clutch members. After this shift is made, the clutch 54 continues to transmit power from the ring gear 34 to the output shaft 50, reaching its maximum speed at the end of Range II.

Figure 4:
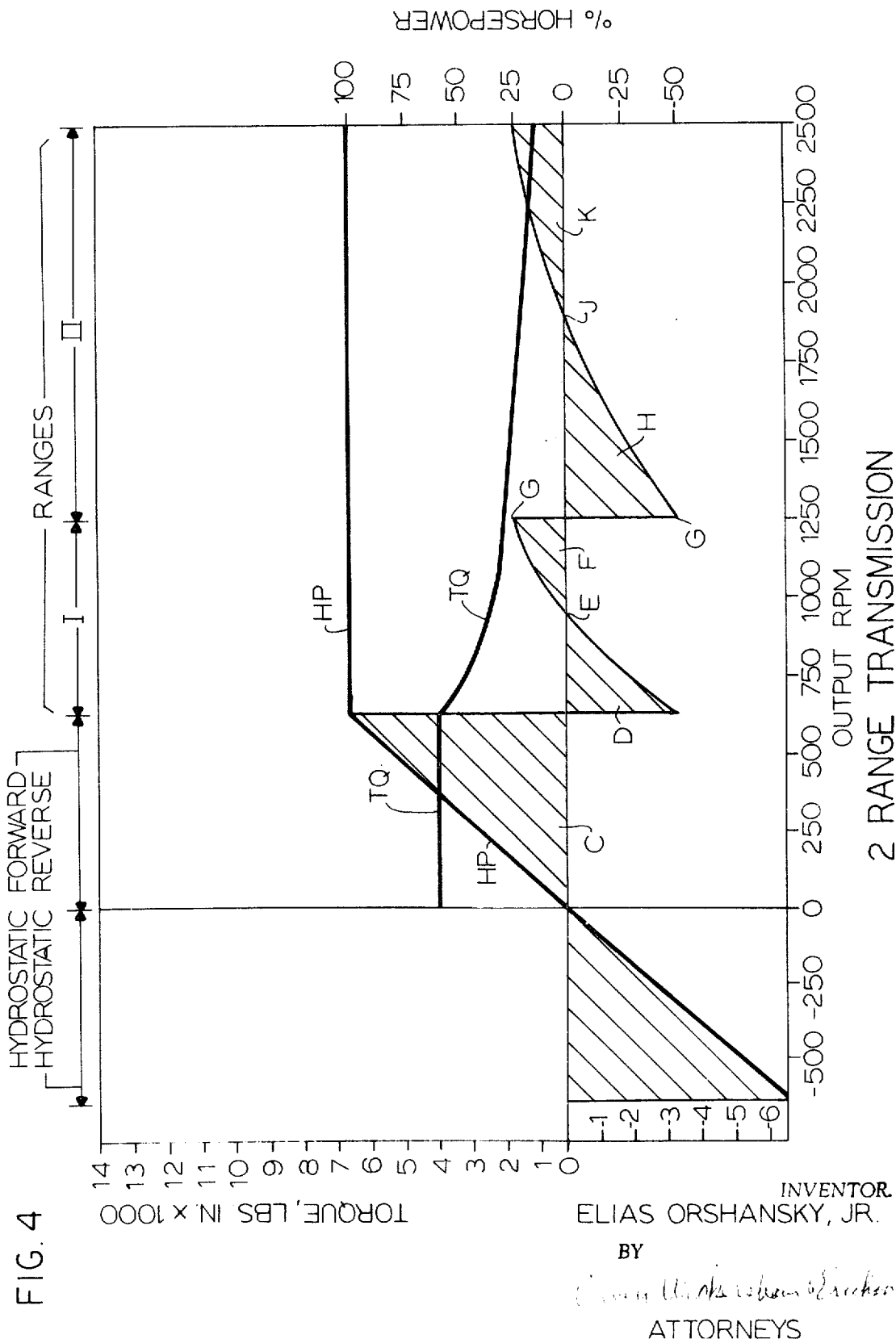
FIG. 4 is a diagram with speed in r.p.m. being plotted against torque in thousands of inch-pounds.

While all these speed relations are taking place, there are interesting relations between the horsepower that is transmitted hydrostatically and that which is transmitted mechanically, and these relations are illustrated in FIG. 4. The amounts of torque and horsepower developed by the output of the transmission are shown, a line HP showing the input horsepower and line TQ showing the output torque. Starting from zero speed, the input horsepower HP increases to a maximum at the end of hydrostatic range. Thereafter the input horsepower HP proceeds at a constant value, whereas the torque TQ is first a constant over the hydrostatic range and thereafter decreases as the speed increases, a necessary condition to be met transmitting constant horsepower over a variation of speed, since torque multiplied by speed is a constant in the constant horsepower range. The shaded areas in FIG. 4 represent the hydraulic horsepower, and in the area C in the hydrostatic range, all the horsepower is hydrostatic.

Thus, starting from zero, the amount of transmitted horsepower hydraulically increases as speed is increased and the cross-hatched area shows that during that period the horsepower is transmitted hydrostatically. However at the shift between hydrostatic and hydromechanical which occurs at the beginning of Range I immediately part of the power begins to be transmitted mechanically and the other part hydrostatically. However, at that point the hydraulic system has to add torque to the planetary because the ratio of the planetary is such that of itself it could not give the desired maximum torque. Consequently, the hydraulic unit 46 acts as a pump and feeds the hydraulic unit 24, which adds its torque through the shaft 23 and the clutch 25 to the gear 26, in addition to the input torque supplied to it by the input shaft 20, the gear 21 and the gear 22. Therefore, the gear 26 transmits added torque to the gear 28, and the total combined hydraulic horsepower which is added to the input plus the 100 percent of the power delivered by the engine to shaft 20 is greater then a hundred percent of the power. This is due to the addition of the hydraulic power, and this portion of the cycle is called regenerative and is identified by the area D, where the hydraulic power is shown below the line, this being convention of illustrating that it is regenerative. That means that the hydraulic horsepower identified by the cross-hatched area D is added to the mechanical input, and that the total horsepower transmitted to the planetary is greater than the input. However, some of this power is again reacting on the reaction gear 43, and therefore is returned back through the hydraulic system 46 and 24, so that in effect the regenerative power recirculates between the hydraulic units 46 and 24, the planetary input 26, and the planetary reaction gear 43, this continual circulation in a circle being called regenerative or recirculative horsepower.

Thus, as the transmission shifts to Range I beyond the hydrostatic range, the amount of hydraulic horsepower is shown by the shaded area D, and the amount of mechanical horsepower transmitted is shown above the zero line and below the line TQ. The amount of hydraulic horsepower at this time is added to the amount of mechanical horsepower, so that in total amount transmitted within the planetary is greater than the input horsepower, and that portion of the range is called regenerative. As the amount of horsepower transmitted hydraulically decreases to zero, which occurs at the point E, the entire power is transmitted mechanically and of course the torque as shown by line TQ is dropping. In other words, at the point E planetary ratio is precisely sufficient to develop all the torque required, and beyond that point the planetary ratio would supply more torque than is possible in view of the horsepower balance. Therefore, part of the power goes into the hydraulic unit 24 directly from the input shaft 20 and gear 21 via the shaft 23 and it is added to hydraulic unit 46 which now acts as a motor, whereas previously it acted as a pump. Thus it causes the planetary to speed up. Hence, at the point E the amount of hydraulic horsepower goes above the zero line, as shown by the shaded area F, because it becomes additive so that the total amount of power transmitted is a sum of the shaded area F and the mechanically transmitted horsepower shown above it. This variation in horsepower is accomplished by stroking the variable stroke hydraulic unit 24, from one side, through zero at the point E, to the opposite side. The area F is called additive horsepower, because the planetary at that point handles less than full horsepower, the difference being added by hydraulics as shown by the area F. This is a very efficient point of operation; the most efficient, of course, being at the point E where no hydraulic power is added, while where the area D exists operation is less efficient. For that reason the most efficient point is preferably at the highest speed, as will be noted from these curves.

Upon reaching the point G, the limit of Range I has been reached, and, due to the shift of the drive from the carrier 37 to the ring gear 34, the functions of mechanical and hydraulic power within the range will repeat themselves again, namely there will be regenerative power transmitted as shown by the area H, and the variable hydraulic unit will be again stroked to the zero point as shown by point J and subsequently to the opposite direction which makes an additive transmission of power as shown by the shaded area K. Thus FIG. 4 indicates the occurrences in transmitting the power and the percentage of power transmitted hydraulically and mechanically throughout the entire range of speed, and this range is divided into an area of constant torque and increasing horsepower, the hydrostatic range, and two ranges of constant horsepower and decreasing torque which are hydromechanical. For the purpose of illustration, this transmission may have a four-to-one range variation between the lowest speed of Range I and the highest speed of Range II and each of the Ranges I and II has a variation of two to one. Consequently, this transmission would be suitable, for instance, for a passenger car.

One object of this invention is to provide the same basic variable speed planetary assembly for the transmissions of multiple ranges. For instance, it has just been described in a two-range transmission. It is possible to have a three-range (FIGS. 5–7) or a four-range (FIGS. 8–10) transmission built on the same planetary assembly, as will now be described. Each one has certain applications. For instance, a three-range transmission of this invention can be used in a highway truck because it may have a ratio of, for instance, eight to one as far as torque multiplication is concerned, and four-range transmission of this invention could be used in off-the-highway trucks, which in this instance for the purpose of illustration, may have a total variation of sixteen to one.

Figure 5:
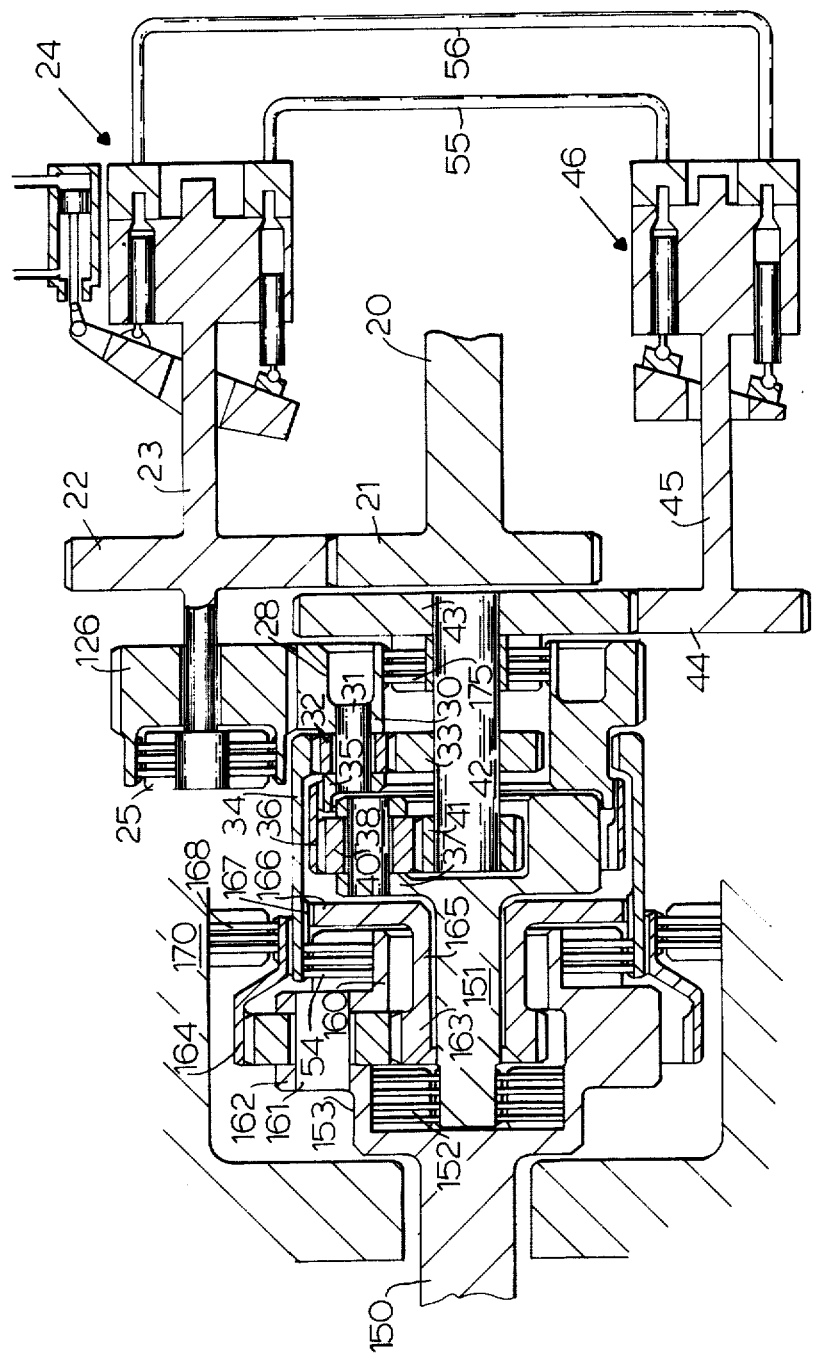
FIG. 5 is a sectional view generally similar to FIG. 1 of a three-range transmission embodying the principles of the invention.
Figure 6:
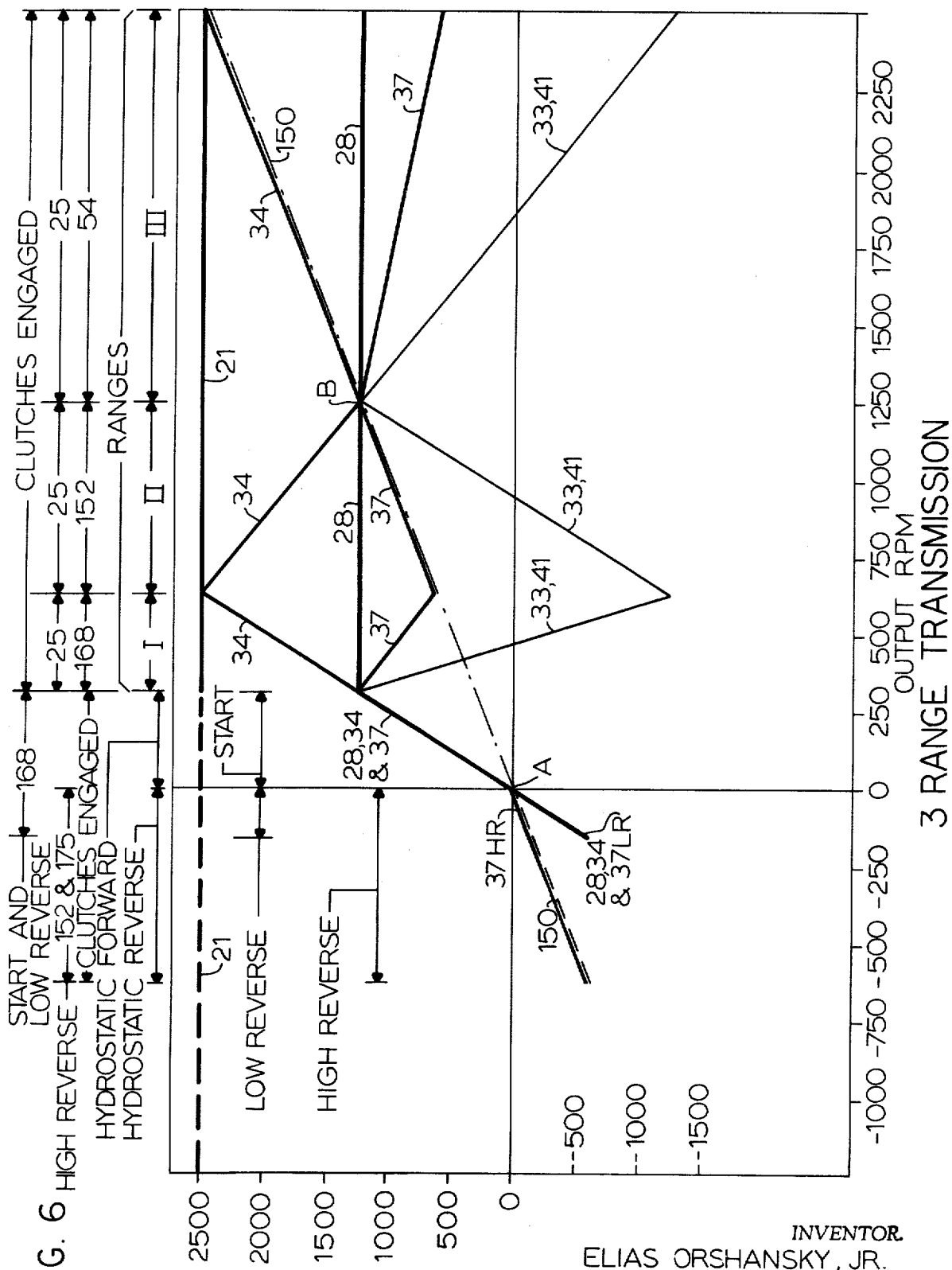
FIG. 6 is a speed lines diagram similar to FIG. 3 for the transmission of FIG. 5.
Figure 7:
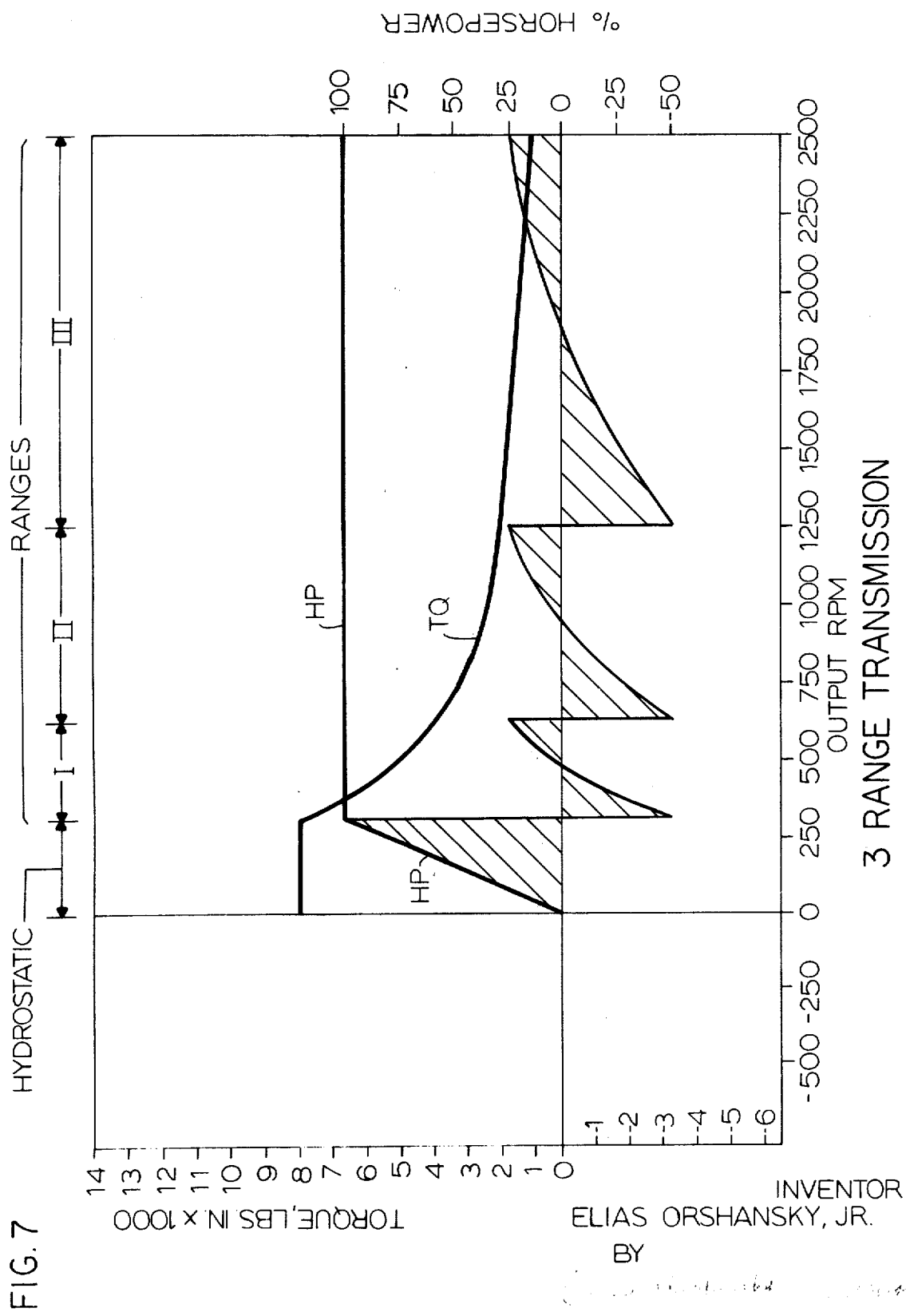
FIG. 7 is a speed torque diagram like FIG. 4, for the transmission of FIG. 5.

A Three-Range Transmission (FIGS. 5–7)

The planetary assembly, the hydraulic units, and some other parts are the same as in the two-range transmission, and the same reference numerals are used for these parts, while for those parts which are different, numerals between 100 and 200 are used.

Thus, the input shaft 20, gears 21 and 22, shaft 23, variable-stroke hydraulic unit 24, and clutch 25 are the same, and the clutch 25 is used to connect to the shaft or to disconnect it from a gear 126 that engages the input gear 28 which is rotatable with the first carrier 30 of the planetary assembly, there is no gear train 47, 48, nor clutch 49, but the gear 43 on the reaction shaft 42 is again meshed with the gear 44 on the shaft 45 for the fixed stroke hydraulic unit 46.

The second carrier 37 of the planetary assembly is mounted on a shaft 151 which is connectable to an output shaft 150 by a clutch 152 having a tube 153 for this purpose. This is the path for one speed range.

The first ring gear 34 is connected by the clutch 54 to a carrier 160 for another planetary assembly, having pins 161 for a third set of planet gears 162 that mesh with a third sun gear 163 and a third ring gear 164. The third sun gear 163 is on a tubular shaft 165 that also has a gear 166 engaging a gear 167 secured to the ring gear 34. The ring gear 164 is clutchable by a brake 168 to a stationary housing 170. The carrier 160 is integral with or secured to the tube 153.

This three-range transmission thus has one outputreduction planetary assembly in addition to the two direct clutches to the output shaft 150. As will be seen, the fourrange transmission of FIGS. 8–10 has two output reduction planetary assemblies in addition to the two direct clutches to its output shaft. As we have already seen, the two-range transmission of FIGS. 1–4 has no reduction planetary assembly, and has only the two direct clutches to the output shaft 50. Thus, all three transmissions have the same basic variable-speed planetary and hydraulic unit arrangement, and the invention can thus provide a family of transmissions which may have two, three, or four or more ranges, depending on the amount of total torque variation required and total horsepower which is to be transmitted.

The speed lines in FIG. 6, for the three-range operation are labeled with the reference numerals for the gears and other members such as carriers to which the speeds apply. The input gear 21 is driven by the engine and, as will be seen, may run at 2500 rpm. The gear 21 drives the gear 22 which is at all times connected by the shaft 23 to the variable-stroke hydraulic unit 24.

The ring gear 34 may be considered a first output for the planetary assembly and it is used in Ranges I and III in driving the output shaft 150. The carrier 37 is the second output which operates in Range II. Beginning with a speed which is 313 rpm on the lower scale, at first, i.e., in Range I, the drive is transmitted through the ring 34 to the final output shaft 150, which is shown in dotted lines on the speed chart, through the reduction planetary assembly which comprises the planet gears 162, sun gear 163, and ring gear 164. To make this planetary assembly transmit the drive, the brake 168 is engaged to the housing 170, which acts as a brake band on the gear 34 and causes the output to be driven at a reduction of 4 to 1 by the sun gear 163. This is the operation in Range I.

As the speed of the output shaft 150 and also of the ring gear 34 increases until the output shaft 150 reaches a speed of 625 rpm, the second output of the variable planetary assembly, which is the carrier 37, which has been decreasing in its speed, reaches a speed equal to the final output shaft, as shown in dashed lines at 625 rpm. At this point, the clutch 152 is engaged to connect the carrier 37 and its shaft 151 directly to the output shaft 150, and immediately thereafter the brake 158 is disengaged. Thus, Range II begins. The speed of the carrier 37 now increases, the increase and decrease of the speed, as always, being controlled by appropriate positions of the stroke of the variable-stroke hydraulic unit 24, which causes the fixed-stroke hydraulic unit to run either in one direction or another, thereby either speeding up or slowing down the reaction members 33 and 41, or, in some cases, holding them stationary.

As the speed of the carrier 37 increases, the speed of the first output, the ring gear 34, decreases without carrying any load, and at a point of 1250 rpm, the speeds of all the planetary members are once more identical, at which point the clutch 54 is engaged to transmit the drive directly from the ring gear 34 to the output shaft 150, and the clutch 152 is subsequently disengaged. The ring gear 34 now proceeds to drive the final output shaft up to 2500 rpm, which is the input speed. Of course, any ratio can be selected.

As in the previous embodiment, the starting range is purely hydrostatic. In it a clutch 175 is engaged to connect the carrier 30 directly to the reaction shaft 42. The clutch 175 remains engaged up to the point of 313 rpm, at which point all the members of the planetary run at the same speed, and therefore there is no relative motion of planetary members. Once any two planetary members are engaged together, the planetary runs as one solid piece of steel; therefore, it can constitute a driving member when driven by the fixed-stroke hydraulic unit 46 through the gears 44 and 43. At the same time, it is of course necessary to disconnect the clutch 25, so that the input drive can come from the input shaft 20 through the gears 21 and 22 to the variable-stroke hydraulic unit 24, which transmits its power hydraulically to the fixed-stroke hydraulic unit 46. Thus, zero speed may be reached by reducing the stroke of the variable unit 24 and, in fact, reverse becomes possible by causing it to go over center and driving the fixed displacement unit 46 in the opposite direction.

The manner in which the three-range transmission shifts from the hydrostatic range to the first range differs from that of the two-range transmission, while, in this particular, the two-range and the four-range transmissions are identical. In fact, the transmission of this invention with an odd number of ranges make this shift in the manner of the three-range transmission, while those with even numbers of ranges will shift as in FIG. 3.

In contrast to the transmission of FIG. 1, the transmission of FIG. 5 at the moment of shift between the hydrostatic range and hydromechanical Range I has all the members 28, 34, and 37 already at the same speed. Consequently, no idlers are necessary and all that is necessary is to clutch any two of the members 28, 34, or 37 together, and then the planetary becomes (in effect) one contiguous or identical piece of steel, and all the members run together. This clutching is accomplished by the clutch 175, which clutches the member 28 to the member 43.

Note that in Range I the brake 168 is engaged, and that this clutch is engaged also in the starting or hydrostatic range and also in reverse. If a higher speed reverse is needed, at which condition low torque only is available, this can be done, too. In some operational requirements a high-speed reverse may be needed, such as when backing a truck tractor around the yard. In that case, the clutches 152 or 54 or both are engaged, and the brake 168 is disengaged at the point of zero speed or at any desired place in the low-speed reduction range, and the reduction planetary gear assembly then drives the vehicle backwards without resort to the final reduction gearing. This is a very useful attribute of this transmission, because a reverse operation sometimes requires extremely high torque, such as when a vehicle has to be backed up over a curb; but most of the time the reverse operation is merely for maneuvering and therefore does not require very high torque.

FIG. 7 corresponds to FIG. 4 and will be clear in view of the description of FIG. 4.

Figure 8:
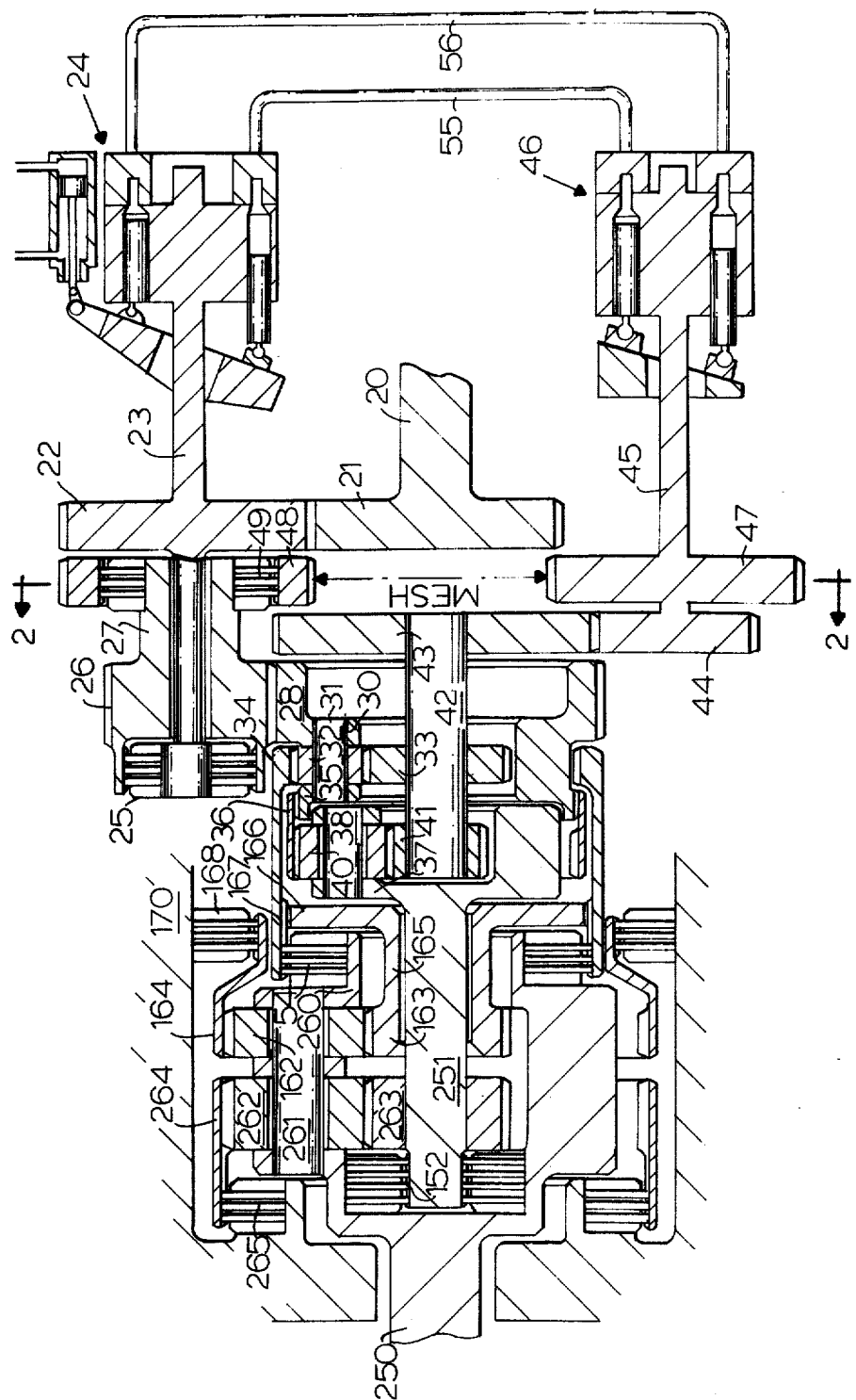
FIG. 8 is a sectional view similar to FIG. 1 of a four-range transmission embodying the principles of the invention.
Figure 9:
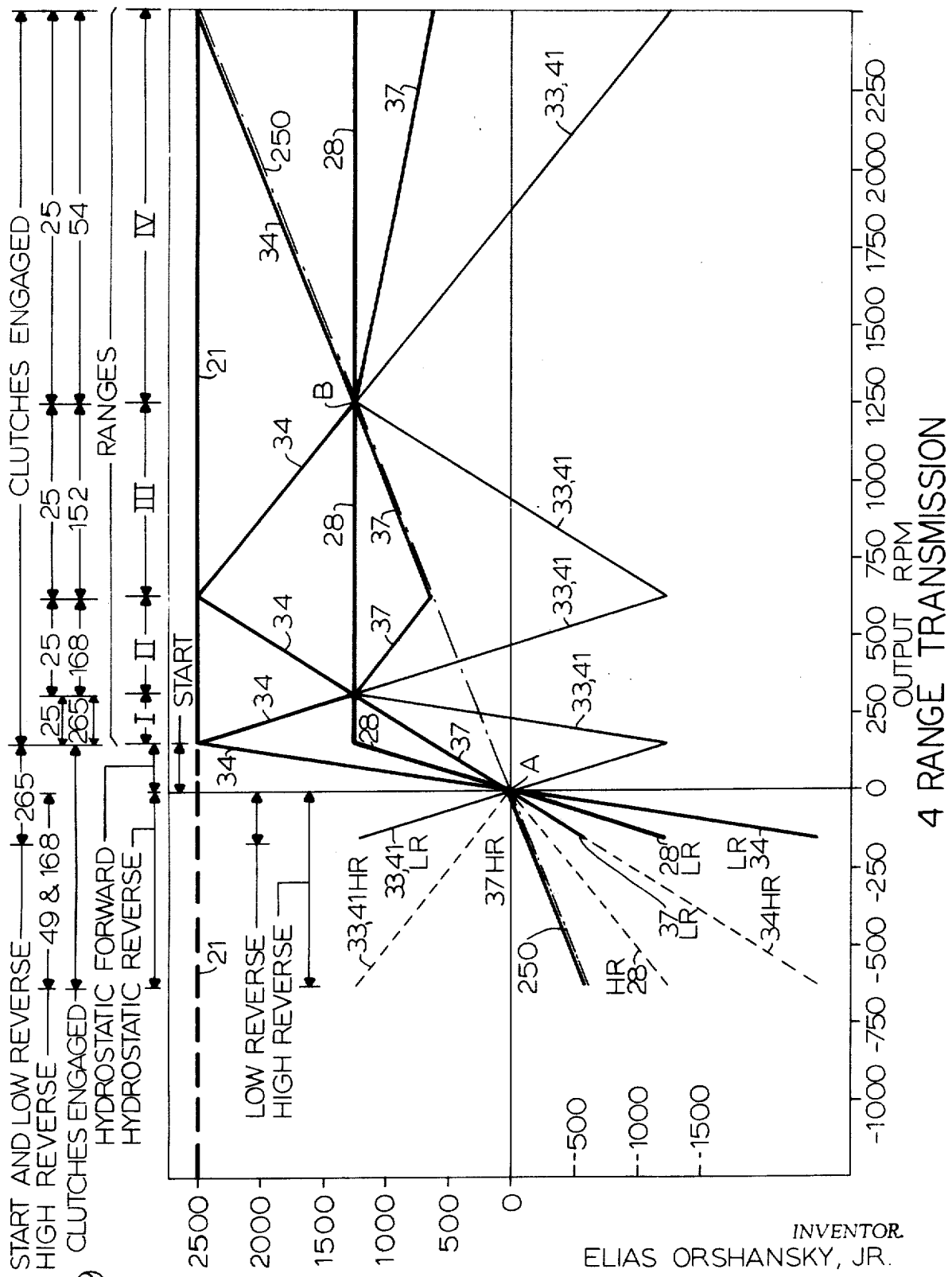
FIG. 9 is a speed lines diagram like FIG. 3 for the transmission of FIG. 8.
Figure 10:
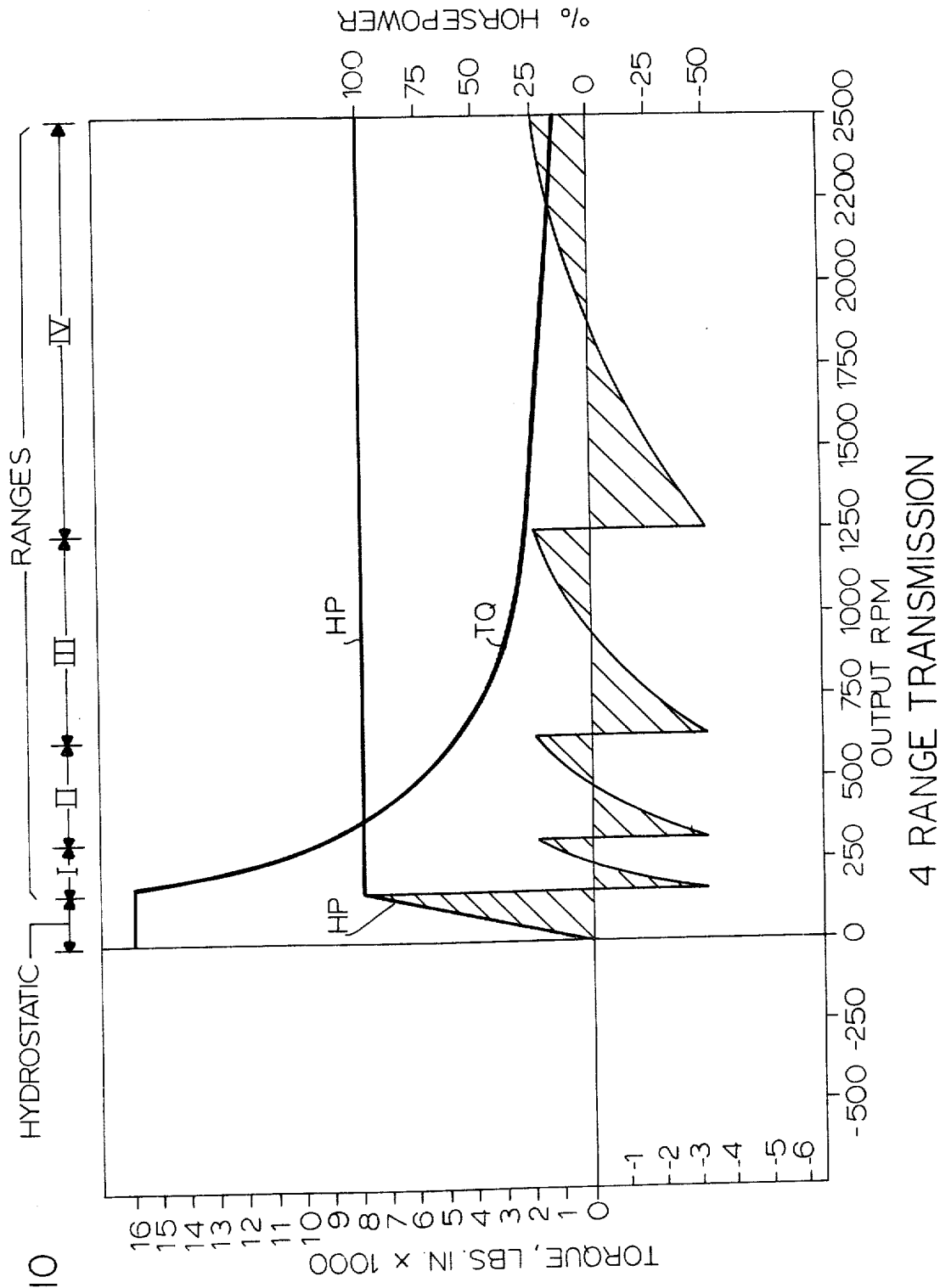
FIG. 10 is a torque-speed diagram like FIG. 4 for the transmission of FIG. 8.

A Four-Range Transmission (FIGS. 8–10)

The principal difference between this four-range transmission and the three-range transmission of FIGS. 5–7 is the use of two output reduction planetary assemblies.

Thus the carrier 160 is replaced by a carrier 260 integral with or connected to the tube 153 having pins 261 that support not only the planet gears 162 but also support a second but separate set of planet gears 262. As before, the planet gears 162 mesh with the sun gear 163 and the ring gear 164, while the planet gears 262 mesh with a sun gear 263 and a ring gear 264. A brake 265 connects the ring gear 264 to or disconnects it from the stationary housing 170 at a smaller radius then the brake 168 does. The shaft 151 is replaced by a longer shaft 251 having the same function, and the sun gear 263 is secured to the shaft 251.

The four-range transmission of FIG. 8 also differs from the three-range transmission of FIG. 5 and resembles the two-range transmission of FIG. 1 in having the gears 47 and 48 and the clutch 49 in lieu of the clutch 175. Shifting from the hydrostatic range to the first hydromechanical range is as in the transmission of FIG. 1.

In the four-range transmission of FIG. 8, Range I is driven by the output carrier 37, shaft 251, and sun gear 263 through a reduction by the planets 262 and a ring gear 264, by actuating the clutch 175. Range II is driven by the ring gear 34 through the sun gear 163 by actuating the clutch 168. Range III is driven directly by the output carrier 37 and its shaft 251 by actuating the clutch 152, and Range IV is driven by the ring gear 34 again through the clutch 54. Thus, the lowest speed for Range I, below which the transmission is operated solely by hydrostatic drive, is not the speed of 313 rpm, as for FIG. 5, but one half of that, or 156 rpm, as the speed lines show.

To place the transmission of FIG. 8 in its hydrostatic state, it is still necessary to lock up the planetary, but this is done here in a different manner, since at a speed of 156 rpm the planetary members all run at different speeds. However, it will be noted that the input member of the planetary assembly, the carrier 30 runs at the same time as the sun gears 33 and 41 but in an opposite direction; consequently, by providing an idler gear 48 to mesh with the gear 47 of the shaft 45 for the fixeddisplacement hydraulic unit, it is possible to mesh the gears 47 and 48 together, and after they are meshed, all their speeds converge to the zero speed as shown. The clutch 49 is used again to accomplish this, and at that time the clutch 25 is disengaged so that the drive may be purely hydrostatic.

Much the same as in the three-range unit, the hydrostatic operation takes place through the final reduction gears 264, 262, and 263 by the actuation of the brake 265 if a lowspeed reverse is wanted, or by directly engaging the clutch 152 or the clutch 54 or both if a highspeed reverse is wanted.

FIGS. 9 and 10 correspond to FIGS. 3 and 4, and no additional description of them is needed.

Figure 11:
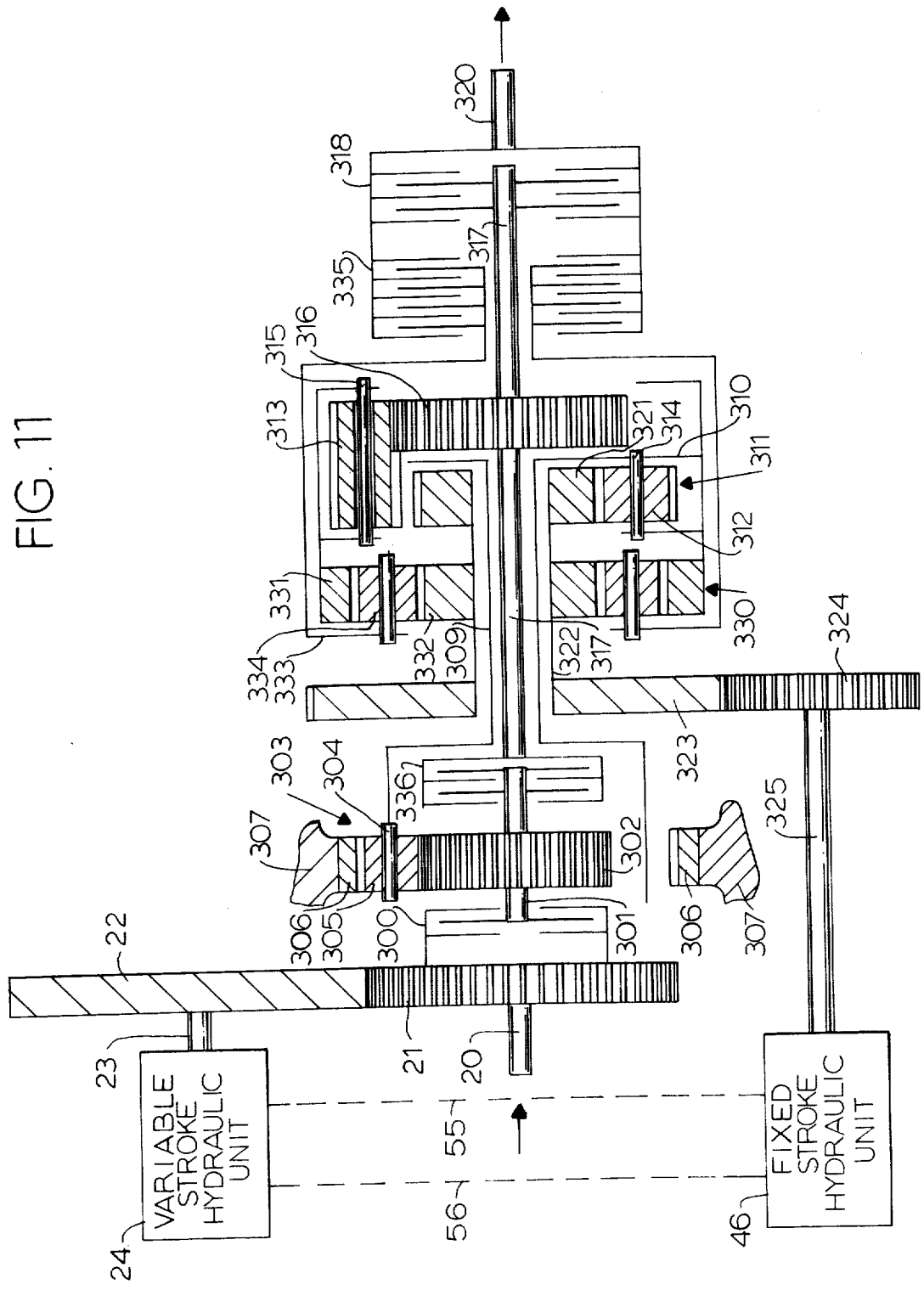
FIG. 11 is a diagrammatic view of another modified form of two-range transmission embodying the principles of the invention.

A Modified Form of Two-Range Transmission (FIG. 11)

Another modified form of transmission of this invention is shown in FIG. 11. The input shaft 20, the input gears 21 and 22, the shaft 23, the variable-stroke hydraulic unit 24, the fixed-stroke hydraulic unit 46, and the hydraulic lines 55 and 56 connecting the hydraulic units, -- these remain the same as before. The shaft 20 or its gear 21 is connected to a clutch 300 which serves to clutch it to a shaft 301. On the shaft 301 is a sun gear 302 of a planetary gear set 303 having a carrier 304, planet gears 305, and a ring gear 306. The outer periphery of the ring gear 306 is fixed to a case 307, as that the ring gear 306 never rotates.

The carrier 304 drives, by means of a hollow shaft 309, a carrier 310 of a planetary gear set 311. The planetary gear set 311 has two sets of planet gears 312 and 313 supported, respectively, on shafts 314 and 315 and carried by the common carrier 310. Each planet gear 312 is in mesh with one planet gear 313. The output from this planetary gear set 311 is a first sun gear 316, which is mounted on a shaft 317, and the shaft 317 is connectible by a clutch 318 to a final output shaft 320. A second sun gear 321 of the planetary set 311 serves as the reaction gear for this planetary gear set. The reaction sun gear 321 is secured to a hollow shaft 322 which is concentric with the shaft 309, and on the shaft 322 is a gear 323. The gear 323 is in mesh with a gear 324 that is carried on a shaft 325, which is in driving relation with the fixed-stroke hydraulic unit 46.

A third planetary set 330 has a ring gear 331 which is drivingly connected to the carrier 310 of the planetary set 311. In addition to the ring gear 331, the second planetary set 330 includes a sun gear 332, which is mounted on the reaction shaft 332 and serves as a reaction gear for the planetary set 330. The set 330 also has a planet carrier 333 and a single set of planet gears 334. The planet carrier 333 is connected to a clutch 335 so that it can be clutched to the final output shaft 320.

The shaft 301 is also connected to a clutch 336 which enables the shaft 301 to be clutched to the shaft 317. It should be noted that the shafts 20, 301, 317, and 320 are coaxial and that the shafts 317, 309, and 322 are all concentric.

The transmission shown in FIG. 11 is functionally identical to that shown in FIG. 1, and therefore the speeds of its elements are consistent with FIG. 3, for, like FIG. 1, this transmission of FIG. 11 is also a two-range transmission. To understand the constructional changes, note that the input in FIG. 1 is transmitted from the input shaft 20 through the gears 21, 22, 26, and 28, and thus the entire load is carried on a one-tooth mesh of the gear pairs 21 and 22 and on a one-tooth mesh of the gear pairs 26 and 28. In FIG. 11, it is intended to lighten this load for use in transmissions of larger horsepower capacity than is contamplated for FIG. 1, and for that reason the reduction in speed, which in FIG. 1 is accomplished by the ratios between the gears 21 and 22 and between the gears 26 and 28, in FIG. 11 is accomplished by the planetary gearing 303. The gears 21 and 22 of FIG. 11 serve to drive the variable-stroke hydraulic unit 24; and the gears 323 and 324 serve to drive the fixed-stroke hydraulic unit 46. The difference in construction of the planetary gear set 311 (as compared with the planetary gear set having the gears 33 and 32 in FIG. 1) is simply choice of the ratio over which the transmission is supposed to operate, and the output sun gear 316 is the equivalent of the output ring gear 34 in FIG. 1. This is commonly done because a long-and-short pinion planet arrangement is the mechanical equivalent except for the ratio of a simple planetary.

The function of the transmission of FIG. 11 is substantially the same as that shown in FIG. 3, in that the drive in the hydromechanical mode is initially from the shaft 20 (with the clutch 300 engaged) through the planetary gear set 303 to its output, the carrier 304, which drives the carrier 310 of the variable planetary assembly 311. The carrier 310 is connected to the ring gear 331 of the second planetary gear set 330, in exactly the same way as are the corresponding elements in FIG. 1.

A difference between the transmission of FIG. 11 and that of FIG. 1 is the manner in which it is used in its hydrostatic start. At the start the clutch 336 is engaged and the clutch 300 is disengaged. This locks the planetary for operation at the speed relationship shown in FIG. 3 and identified on that figure under the heading of "hydrostatic forward." The drive, therefore, is straight hydraulic by means of the fixed-stroke hydraulic unit 46 through the gears 324 and 323 and thereafter to the planetary whose members operate at the speed relationship shown in FIG. 3. During this interval the clutch 335 is engaged. When the speed, starting from zero, of the output shaft 50 in FIG. 3 or 320 in FIG. 11 reaches the point corresponding to the bottom of Range I, then the clutch 300 is first engaged and the clutch 336 is then disengaged, and the transmission proceeds in a hydromechanical range through Ranges I and II, exactly as described for FIGS. 1 and 3.

By referring to FIG. 3, where it will be seen that when the member 34 operates at its maximum speed at the same speed as the input shaft 21, it will be seen that the member 34 is the equivalent of the gear 316. The two speeds (of the shaft 301 and the gear 316) are equal at the beginning of Range I and, again, at the end of Range II, which can be used for a highspeed lock up, if desired. At the beginning of Range I, the clutch 300 is engaged, and immediately thereafter the clutch 336 is disengaged.

Two Transmissions With Identical-in-size Planetary Assemblies (FIGS. 12–16)

FIGS. 12 through 16 show transmissions generally like those that have been discussed earlier but having some special characteristics. These special characteristics flow largely from the great advantages which can be obtained by making all of the planetary assemblies identical in size. This means, in effect, that there is only one model and size of sun gear, only one model and size of planet gear and planet carrier, and only one size and model of ring gear. Thus, the tooling costs are greatly reduced, as is the inventory of parts.

One further advantage can be obtained by combining two of the sun gears into a single gear for use in this invention, since the sun gears are serving as reaction members and are linked together. In together anyway. three-range system this increases by one the number of different parts.

An important feature of this aspect of the invention is the increased efficiency in the high range, and this can be further increased by not extending the high range to its ultimate but by stopping it at a lower point.

Figure 13:
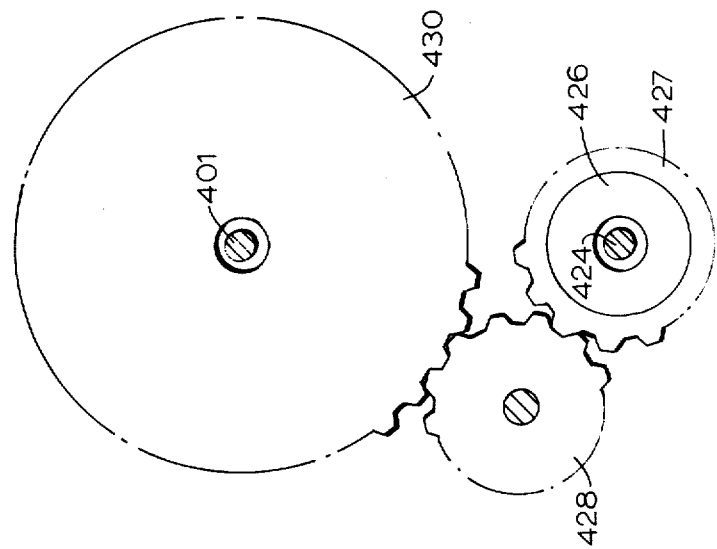
FIG. 13 is a view in section taken along the line 13—13 in FIG. 12.
Figure 12:
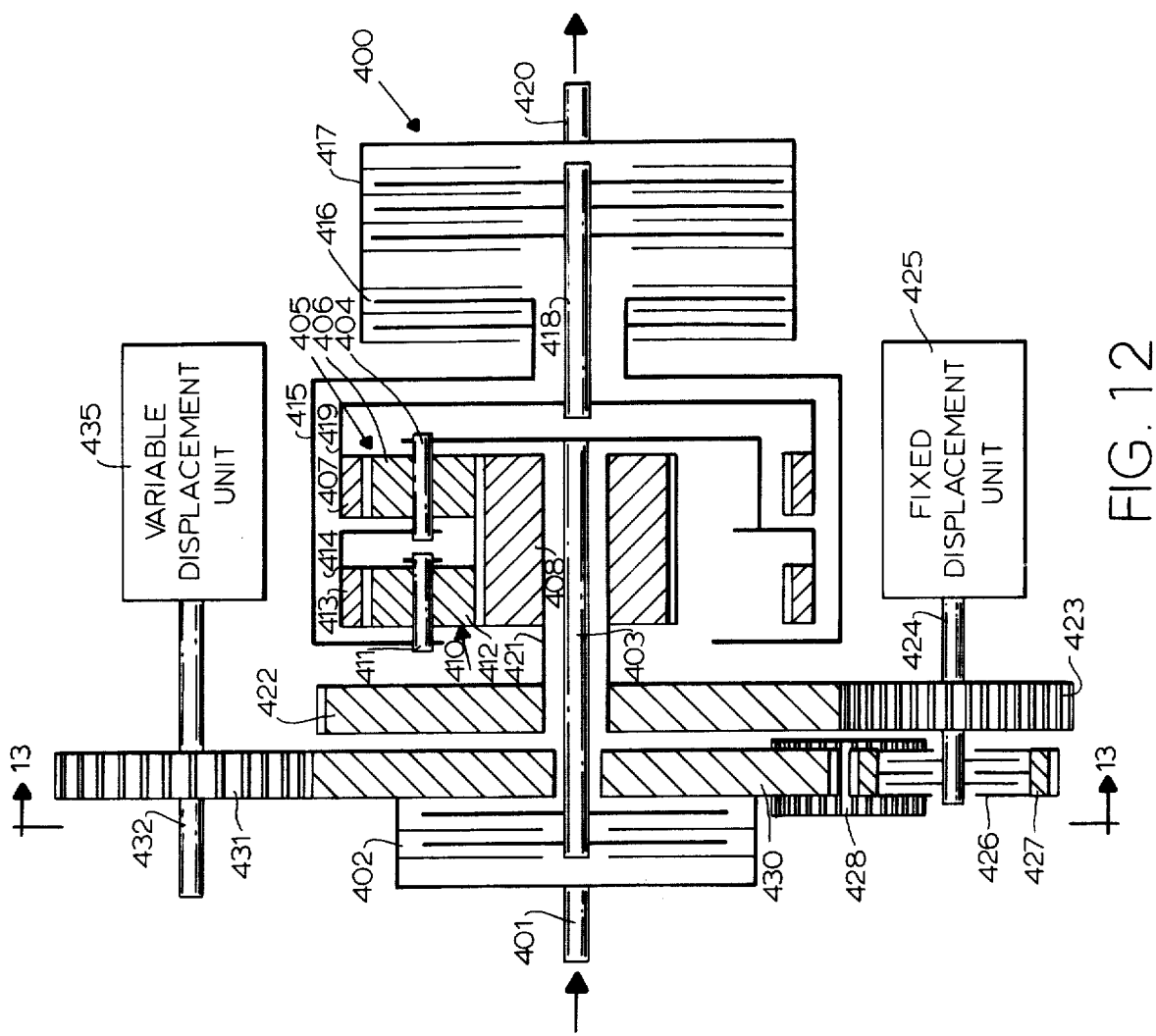
FIG. 12 is a diagrammatic view of another modified form of two-range transmission embodying the principles of the invention.
Figure 14:
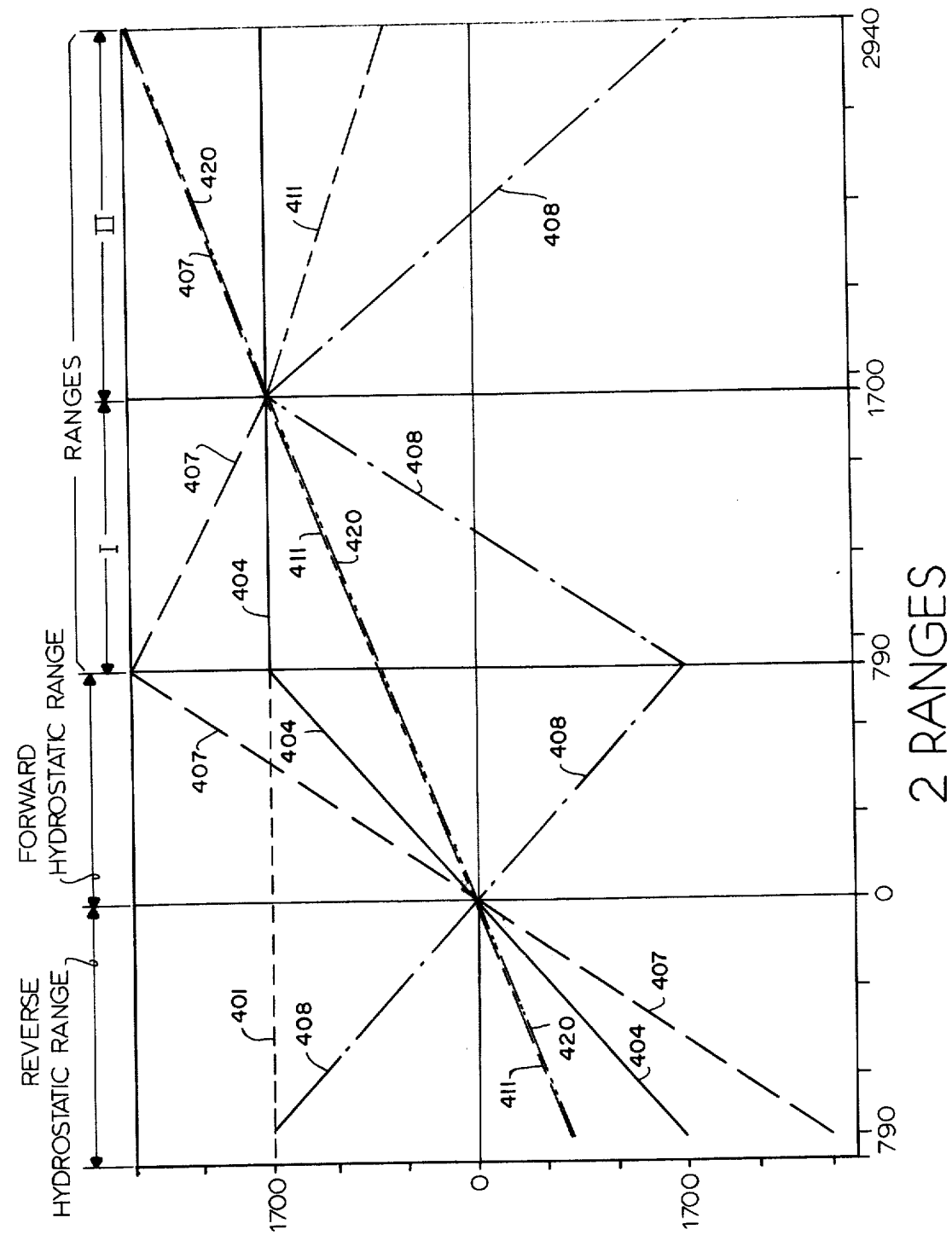
FIG. 14 is a speed lines diagram similar to FIG. 3 for the transmission of FIGS. 12 and 13.

The Modified Two-Range Transmission 400 of FIGS. 12–14

The two-range transmission 400, shown in FIGS. 12 and 13, has an input or drive shaft 401 which can be clutched by a clutch 402 to a shaft 403 directly in line with the shaft 401. This shaft 403 is connected directly to the carrier 404 of a first planetary gear set 405, in a direct-drive input. The planet carrier 404 carries planet gears 406, which are in mesh with a ring gear 407 and with a sun gear 408. The sun gear 408 may be elongated and made to serve as the sun gear for a second planetary gear set 410, or the two sets 405 and 410 may have separate sun gears that are secured together.

The second planetary gear set 410 has a planet carrier 411 with planets 412 in engagement with its sun gear, which here is shown as the sun gear 408, and a ring gear 413, which in this arrangement is directly driven by the planet carrier 404 through a member 414. The planet carrier 411 is connected by a member 415 to a clutch 416 leading to an output drive shaft 420, and to a clutch 417 leading to a shaft 418. The shaft 418 is connected directly by a member 419 to the ring gear 407.

The sun gear 408 is mounted on a hollow shaft 421 on which is also mounted a gear 422 which meshes with a gear 423 that is mounted on a shaft 424 that is in driving relation with a fixed displacement hydraulic unit 425. The shaft 424 may, by means of a clutch 426, be placed in driving relation with a gear 427, which, through an idler 428, is a driving relationship with a gear 430. The gear 430 is in driving relationship with the input shaft 401 it also meshes with a gear 431 that is mounted on a shaft 432 and through that is in driving relationship with a variable stroke hydraulic unit 435.

The operation of this device will be understood from what has been described previously and it is not necessary to review it. It can be seen diagrammatically in FIG. 14, where the speed lines are shown and are identified with the parts concerned. Some advantages in the system are shown there, and it will be seen that the input speed in this instance is always lower than the ultimate output speed and, as said before, the ultimate output can be stopped short of its full possibility in order to improve the efficiency in the upper range. The device also improves that efficiency by the overlapping which is obtained. In addition it has, as already been said, the great advantage of greatly reducing the number of different parts that are required. As compared with the transmission of FIG. 11, there are three fewer gears, as compared with FIG. 1, there is only one fewer gear, and there are two fewer gears that differ from each other.

Figure 15:
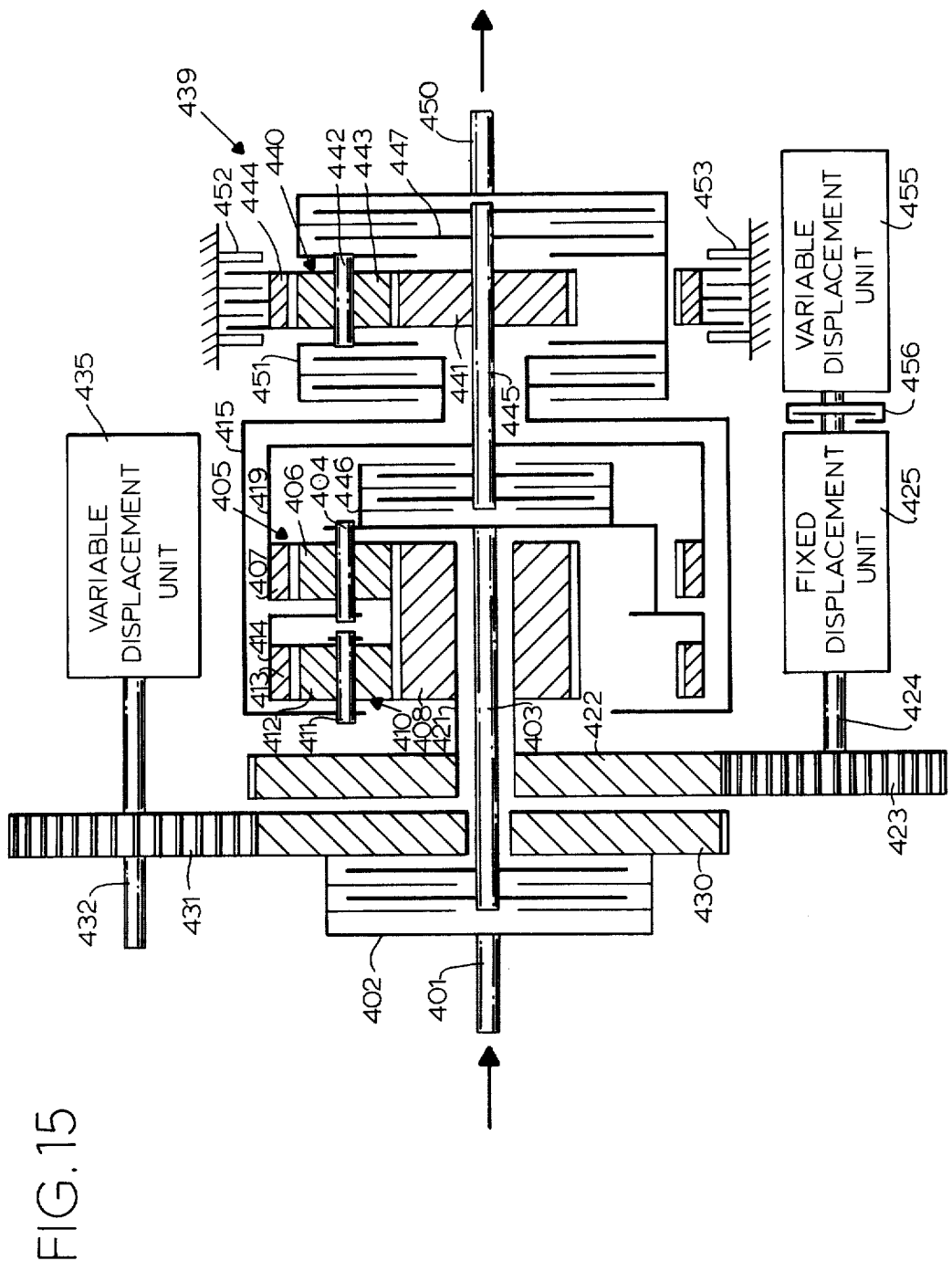
FIG. 15 is a diagrammatic view of a modified three-range transmission embodying the principles of the invention.
Figure 16:
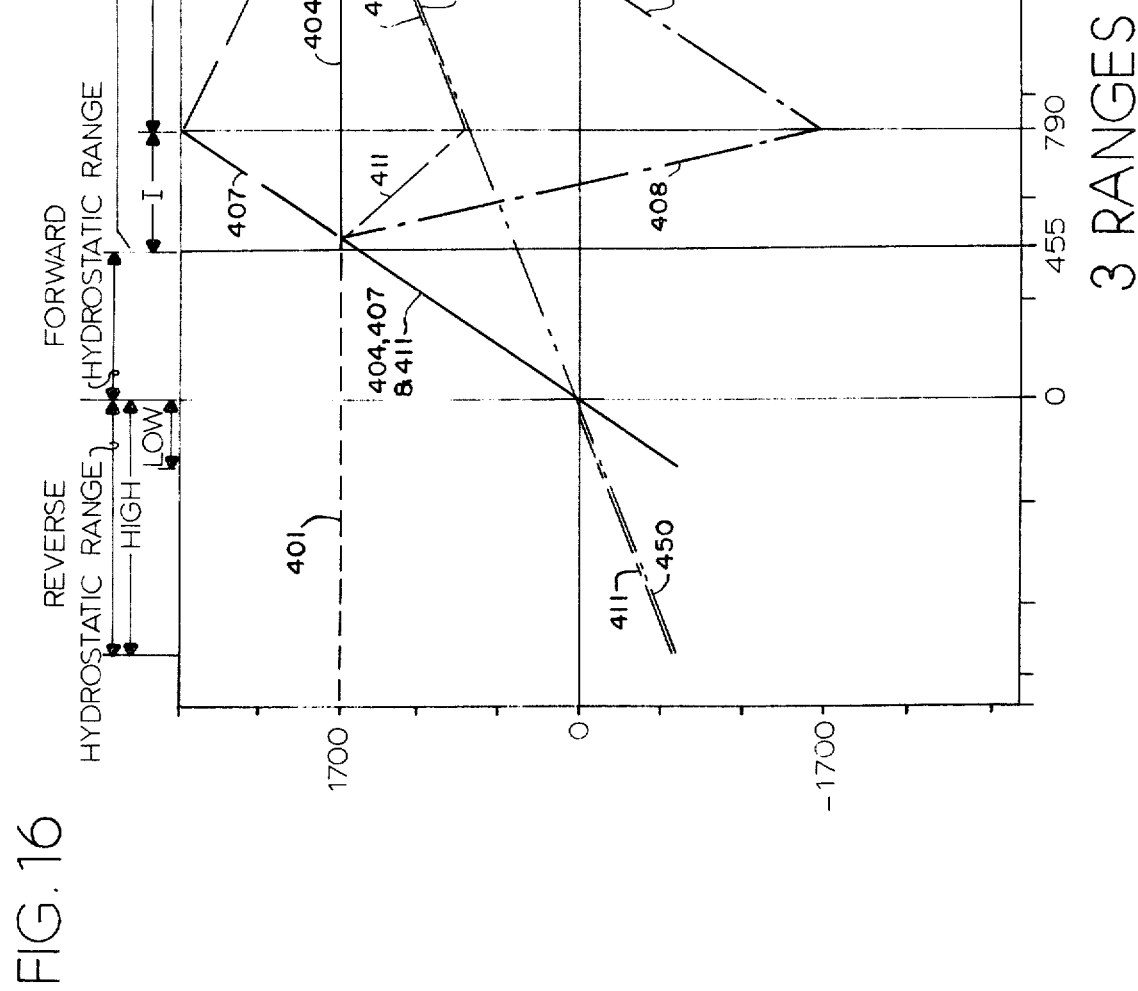
FIG. 16 is a speed lines diagram somewhat similar to FIG. 6 for the transmission of FIG. 15.

The Three-Range Transmission 439 of FIGS. 15 and 16

FIG. 15 shows a transmission 439 generally like the transmission 400 of FIG. 12 and similar numbers have been applied where they are appropriate.

The first two stages of operation are the same as in the transmission 400, and these two planetaries are identical to what has been described already. There is no need for the idler connection between the shaft 423 and the member 430, so that is dispensed with and is not present in this form of the invention. The output is somewhat different, and there is a third planetary assembly which is substantially identical to the other planetary assemblies except that the sun gear is not elongated, but it is a gear of the same diameter.

Thus, the transmission 439 has a planetary assembly 440 with a sun gear 441, a planet carrier 442, planet gears 443, and a ring gear 444. The sun gear 441 is mounted on a shaft 445, which is connected by a clutch 446 to the carrier 404 of the first planet assembly 405; the clutch 406 is also directly connected to the shaft 403. The shaft 445 is also connected by a clutch 447 to an output shaft 450. The clutch 447 is connected directly to the carrier 442 on its output side so that the planet carrier 442 is directly connected to the output shaft 450.

A clutch 451 is connected to the member 415, which is connected to the planet carrier 411 of the second planetary set 410. The opposite side of the clutch 451 is connected to the carrier 442. The ring gear 444 is connected to a clutch 452 which enables it to be clutched to the housing 453 and therefore to be restrained entirely from movement. This corresponds to what has been previously described in the three-range transmission of FIG. 5, but it accomplishes the same basic thing by using a combination in which all the planet gears are identical in size and teeth, all the sun gears are identical in diameter and teeth, and all the ring gears are also identical in size and teeth. If desired, of course it is not necessary to make a single sun gear 408 for both the planetary sets 405 and 410. There may be separate sun gears both joined to the same shaft 421.

For the sake of example, another feature of the invention is shown in FIG. 15. In this special form of the invention there is another variable displacement hydraulic unit 455 which is aligned with the fixed displacement unit 425 and is clutchable to the shaft 424 by a clutch 456. It is, of course, possible to omit this clutch, but if it is omitted, there will be greater losses at higher speeds. This unit 455 can be isolated by valving or it is possible to run the fluid through both units at the same time. Both the fixed displacement unit 425 and the variable displacement unit 455 are connected by hydraulic lines to the variable displacement unit 435. This is easily done, and how to do it is well known and so it is not shown. This structure enables a higher torque output in the hydrostatic range--i.e., when the clutches 447 and 453 are engaged and the clutch 402 is disengaged. In this way maximum output torque can be obtained at lower efficiency, while at the same time a very high efficiency can be developed in the hydromechanical range at road speeds. The decreased efficiency at the start is not important, because the vehicle cannot absorb full enging power under this condition, since the additional hydrualic unit 455 is variable and has a maximum displacement only when the vehicle is starting from a standstill and its displacement is reduced to zero by the time the transmission 439 reaches the end of its hydrostatic range.

Ther are certain limitations of overall hydromechanical ratio of the three-range transmission 439 when it uses identical planetary gears. Thus, an overall ratio of approximately 6:4 is the only such ratio obtainable. Fortunately, this ratio is the right one for many applications, and part of the range may be used in those applications which require a narrower range. However, if a different overall hydromechanical range is required, in order to obtain the greatest possible efficiency or in other to use the smallest possible hydraulic units, then the gears of the first and second planetary assemblies 405 and 410 may still be identical with only the gears of the third hydrualic assembly 440 different. The two-range transmission 400 does not have any such limitation, and can accommodate any range, within reasonable proportions of the planetary gears.

FIG. 16 shows the speed lines for the unit 439 of FIG. 15. It will be noted that they resemble the speed lines shown in FIG. 6 but are located somewhat differently and that the input is lower than the output. There are some members missing that were present in FIG. 6, and there is a shifting of the points. All the speed lines are indicated by the numerals corresponding to the parts shown on FIG. 15.

It may be noted that a three-range transmission such as is shown in FIG. 15 may be used as a two-range transmission; if the third range is never to be used, then the clutch 447 may be omitted. Such a structure achieves the result that the speed of the output shaft 450 will then never exceed the speed of the input shaft 401, (as in the case of the two-range transmission of FIGS. 12–14). Where such a result is desired--as in a turbine engine where the input shaft is running at quite a high speed--and where two-range transmission can achieve the desired results, this is a way of providing the necessary structure.

To those skilled in the art to which this invention relates, many changes in construction and widely differing embodiments and applications of the invention will suggest themselves without departing from the spirit and scope of the invention. The disclousres and the description herein are purely illustrative and are not intended to be in any sense limiting.

I claim:

1. A power transmission comprising
   input means,
   output means,
   a planetary assembly having an input member, two coaxial output members, and reaction means, and having two separate and distinct sets of planet gears, each set being mounted on separate and distinct rotatable carriers,
   means for alternately and separately connecting each of said output members to said output means, and
   speed-varying means for causing one said output member to increase its speed and for simultaneously causing the other said output member to decrease its speed and vice versa.

2. A power transmission comprising
   input means,
   output means,
   a planetary assembly having an input member, two coaxial output members, and reaction means, and having two separate and distinct sets of planet gears, each set being mounted on a separate and distinct rotatable carrier, and
   speed-varying means for causing one said output member to increase its speed and for simultaneously causing the other said output member to decrease its speed and vice versa,
   said speed-varying means comprising a pair of hydraulic units hydraulically interconnected so that one serves as a pump while the other serves as a motor and vice versa, a first said unit being connected in driving relation to said input means, a second said unit being connected in driving relation to said reaction means.

3. A power transmission according to claim 2, wherein said first unit is variable in stroke and runs during operation at constant speed while said second unit is fixed in stroke and variable in speed.

4. A power transmission comprising
   input means, output means,
a planetary assembly having an input member, two coaxial output members, and reaction means,
speed-varying means for causing one said output member to increase its speed and for simultaneously causing the other said output member to decrease its speed and vice versa,
said planetary assembly comprising two planetary gear trains, each having its own input member, output member and reaction member, the input member of a first said gear train being connected to said input means, the input members of the two said gear trains being connected together so that both are driven by said input means, said reaction members of said two gear trains being interconnected, and said coaxial output members being separately clutchable to said output means, and
clutch means for engaging and disengaging said input means with and from said input member of said first gear train.

5. A power transmission according to claim 4, wherein a drive gear is always engaged with said input member of said first gear train, and said clutch means engages and disengages said drive gear with and from said input means.

6. A power transmission according to claim 5 having additional clutch means for engaging said drive gear with said reaction members and for disengaging it therefrom.

7. A power transmission according to claim 6 having idler means, said drive gear being connected to said reaction members when said additional clutch means is engaged through said idler means.

8. A power transmission according to claim 5 having a reaction shaft carrying both said reaction members, and additional clutch means causing direct engagement of said input member of said first gear train with said reaction shaft.

9. A power transmission according to claim 4 wherein said two planetary gear trains are identical, each having identical input members, identical output members, and identical reaction members.

10. A power transmission according to claim 9 wherein said identical reaction members comprise a single elongated gear having portions for each said planetary gear train.

11. A transmission, comprising
a planetary assembly having a single input means, two coaxial output means, and a single reaction means, and having two separate and distinct sets of planet gears, each set being mounted on a separate and distinct rotatable carrier, and
two hydraulic pump-motors connected to each other, one serving as a pump while the other serves as a motor, and vice versa,
one said pump-motor being connected to said input means and the other to said reaction means,
said pump-motors serving as means for varying the speed of said two output means so that one increases in speed while the other decreases in speed and vice versa.

12. The transmission of claim 11 wherein said single reaction means is coaxial with said two coaxial output means.

13. A transmission comprising
a planetary assembly having, all coaxial with each other, a single input means, two output means, and a single reaction means, and having two separate and distinct sets of planet gears, each set being mounted on a separate and distinct rotatable carrier,
two hydraulic pump-motors connected to each other, one serving as a pump while the other serves as a motor, and vice versa,
one said pump-motor being connected to said input means and the other to said reaction means,
said pump-motors serving as means for varying the speed of said two output means so that one increases in speed while the other decreases in speed and vice versa.

14. A transmission, comprising
a planetary assembly having a single input means, two output means, and a single reaction means, and having two separate and distinct sets of planet gears, each set being mounted on a separate and distinct rotatable carrier,
an output shaft,
clutch means directly connecting said output members to said output shaft, and
two hydraulic pump-motors connected to each other, one serving as a pump while the other serves as a motor, and vice versa,
one said pump-motor being connected to said input means and the other to said reaction means,
said pump-motors serving as means for varying the speed of said two output means so that one increases in speed while the other decreases in speed and vice versa.

15. A power transmission, including in combination:
input means,
output means,
two planetary gear trains each having its own input member, output member and reaction member,
the input member of a first said gear train being connected to said input means, the input members of the two gear trains connected together so that both are driven by said input means,
the reaction members of the two gear trains being interconnected, and
their output members being coaxial and separately clutchable to said output, means and
speed varying means for causing one said output member to increase its speed and for simultaneously causing the other said output to decrease its speed, and vice versa.

16. The power transmission of claim 15 wherein said speed varying means comprises:
a pair of hydraulic units hydraulicallly interconnected so that one serves as a pump while the other serves as a motor and vice versa,
a first said unit being connected in driving relation to said input means,
a second said unit being connected in driving relation to said reaction members,
said first unit being variable in stroke and running during operation at constant speed while said second unit is fixed in stroke and variable in speed.

17. The power transmission of claim 16 having
a drive gear always engaged with said input member of said first gear train,
clutch means for engaging and disengaging said input means with and from said drive gear,
idler means in driving relation with said second unit, additional clutch means for engaging said drive gear, through said idler means, with said reaction members and for disengaging it therefrom.

18. The power transmission of claim 15 wherein at least one said output member is clutchable to said output means through a reduction gear train.

19. The power transmission of claim 18 wherein both said output members are clutchable to said output means through separate reduction gear trains.

20. The power transmission of claim 15 wherein both said output members are clutchable directly to said output means.

21. A power transmission, including in combination:
input means,
output means,
two planetary gear trains each having its own carrier and its own planet, sun, and ring gears, to provide an input member, an output member and a reaction member,
the input of a first said gear train being its carrier and being connected to said input means, the input member of a second gear train being its ring gear and being drivingly connected to the carrier of said first gear train, so that both are driven by said input means,
the reaction members of the two gear trains being the sun gears mounted on a common reaction shaft,
the output members of the two gear trains being coaxial and separately clutchable to said output means, and
speed varying means for causing one said output member to increase its speed and for simultaneously causing the other said output member to decrease its speed, and vice versa.

22. The power transmission of claim 21 wherein the output member of said first gear train is its ring gear.

23. A power transmission, including in combination:
input means,
output means,
two planetary gear trains each having its own carrier and its own planet, sun, and ring gears, to provide an input member, an output member and a reaction member,
the input member of a first said gear train being its carrier and being connected to said input means, the input member of a second said gear train being its ring gear and being drivingly connected to the carrier of said first gear train, so that both are driven by said input means,
the reaction members of the two gear trains being the sun gears mounted on a common reaction shaft,
the output members of the two gear trains being coaxial and separately clutchable to said output means,
speed varying means for causing one said output member to increase its speed and for simultaneously causing the other said output member to decrease its speed, and vice versa,
a stationary causing,
a reduction planetary assembly having a sun gear, a ring gear, and planet gears and a carrier secured to said output means,
driving connection means connecting said ring gear of said first gear train to the sun gear of said reduction planetary assembly,
first clutch means for connecting said ring gear of said first gear train to said carrier of said reduction planetary assembly, and
first brake means for connecting said ring gear of said reduction planetary assembly to said stationary casing, to hold that ring gear stationary.

24. The power transmission of claim 23 wherein the output member of said second gear train is its carrier having integral therewith an extension shaft aligned with said reaction shaft.

25. The power transmission of claim 24 having in addition:
a second reduction planetary assembly having the same carrier as the first-mentioned said reduction planetary assembly and having a sun gear mounted on and in driving relation with said extension shaft, planet gears, and a ring gear,
second clutch means for coupling said extension shaft to said output means, and
second brake means for coupling said ring gear of said second reduction planetary assembly to said stationary casing.

26. A power transmission, including in combination:
input means,
output means,
two planetary gear trains both coaxially aligned with said output means and each having its own input member, output member, and reaction member,
the input member of a first said gear train being connected to said input means and to the input member of the second said gear train, so that both said gear trains are driven by said input means,
the reaction members of the two gear trains being secured to a common reaction shaft,
clutch means for separately clutching said output members to said output means, and
speed varying means for causing one said output member to increase its speed while simultaneously causing the other said output member to decrease its speed and vice versa.

27. The power transmission of claim 26 wherein said speed varying means comprises:
a pair of hydraulic units hydraulically interconnected so that one serves as a pump while the other serves as a motor and vice versa,
a first said unit being connected in driving relation to said input means,
a second said unit being connected in driving relation to said reaction shaft,
said first unit being variable in stroke and running during operation at constant speed while said second unit is fixed in stroke and variable in speed, and
said input means comprises:
an input shaft having a first gear thereon,
an auxiliary shaft having a second gear thereon meshed with said first gear, said shaft driving said first unit,
a third gear mounted rotatably on said auxiliary shaft and engaging the input means of said first gear train, and
clutch means for engaging and disengaging said thrid gear with and from said auxiliary shaft.

28. The power transmission of claim 27 wherein said third gear has an extension,
said second unit has a shaft with fourth and fifth gears secured thereto, a sixth gear secured to said reaction shaft and meshed with said fourth gear, a seventh gear meshed with said fifth gear, and additional clutch means for engaging said extension of said third gear with said seventh gear and for disengaging it therefrom.

29. The power transmission of claim 27 having additional clutch means for causing direct engagement of said input member of said first gear train with said reaction shaft.

30. In a power transmission having input means and output means, the combination therewith of:

two planetary gear trains each having its own carrier and its own planet, sun, and ring gears, to provide an input member, an output member and a reaction member, the input member of a first said gear train being its carrier and being connectable to said input means, the input member of a second said gear train being its ring gear and being connected by gear coupling to the carrier of said first gear train, so that both are driven by said input means, the reaction members of the two gear trains being the sun gears mounted on a common reaction shaft, the output members of the two gear trains being separately clutchable to said output means, the output member of said first gear train being its ring gear, a stationary casing, a reduction planetary assembly having a sun gear, a ring gear, and planet gears and a carrier secured to said output means, driving connection means connecting said ring gear, a ring gear, and planet gears and a carrier secured to said output means, driving connection means connecting said ring gear of said first gear train to the sun gear of said reduction planetary assembly, first clutch means for connecting said carrier of said second gear train to said carrier of said reduction planetary assembly, and first brake means for connecting said ring gear of said reduction planetary assembly to said stationary casing, to hold that ring gear stationary, said reduction planetary assembly and said first and second planetary assemblies all being identical to each other as to the sizes and teeth of their gears and carriers, and speed varying means comprising a pair of hydraulic units hydraulically interconnected so that one serves as a pump while the other serves as a motor and vice versa, a first said unit being connected in driving relation to said input means and being variable in stroke and set to run at a constant speed, a second said unit being connected in driving relation to said common reaction shaft and being fixed in stroke and variable in speed in both directions, a shaft on which said second unit is mounted, a third hydraulic unit clutchable to said last-named shaft and connected to said first hydraulic units for use along with said second unit, said third unit being variable in stroke.

31. A hydromechanical transmission, including in combination a planetary assembly having a first sun gear serving as a reaction member, a first ring gear serving as a first output member, a first planet carrier serving as the input member and carrying a first set of planet gears meshed with both said first sun gear and said first ring gear, a second sun gear serving as a reaction member, a second ring gear serving as an input member, and splined to said first planet carrier, a second planet carrier serving as a second output member and carrying a second set of planet gears meshed with both said second sun gear and said second ring gear, a common reaction shaft to which both said first and second sun gears are secured, an input shaft, drive transmitting means for connecting and disconnecting said input shaft with said first planet carrier, an output shaft, a pair of synchronous clutch means for connecting, during a first hydromechanical speed range, said second planet carrier to said output shaft and, during a second hydromechanical speed range, said first ring gear to said output shaft, with over lap at the shift point between said first and second speed ranges, a variable-displacement hydraulic unit driven mechanically by said input shaft, a fixed-displacement hydraulic unit, driven hydraulically by said variable-displacement hydraulic unit and having an auxiliary shaft, and gear means connecting said auxiliary shaft of said fixed-displacement hydraulic unit to said reaction shaft.

32. A hydromechanical transmission, including in combination:

a planetary assembly having a first sun gear serving as a reaction member, a first ring gear serving as a first output member, a first planet carrier serving as the input member and carrying a first set of planet gears meshed with both said first sun gear and said first ring gear, a second sun gear serving as a reaction member, a second ring gear serving as in input member, and splined to said first planet carrier, a second planet carrier serving as a second output member and carrying a second set of planet gears meshed with both said second sun gear and said second ring gear, a common reaction shaft to which both said first and second sun gears are secured, an input shaft, drive transmitting means for connecting said input shaft to and disconnecting it from said first planet carrier, an output shaft, a pair of synchronous clutch means for connecting, during a first hydromechanical speed range, said second planet carrier to said output shaft and, during a second hydromechanical speed range, said first ring gear to said output shaft, with overlap at the shift point between said first and second speed ranges a variable-displacement hydraulic unit driven mechanically by said input shaft, a fixed-displacement hydraulic unit, driven hydraulically by said variable-displacement hydraulic unit and having an auxiliary shaft, gear means connecting said auxiliary shaft of said fixed-displacement hydraulic unit to said reaction shaft, a stationary housing, a reduction planetary train having a third carrier locked to said output shaft, a third set of planet gears, a third sun gear having an auxiliary gear meshed to said first ring gear, a third ring gear, and brake means for connecting said third ring gear to said stationary housing.

33. The hydromechanical transmission of claim 32 having hydrostatic start and reverse means, comprising:
a drive gear in said drive transmitting means, driving said first planet carrier,
a first clutch for placing said drive gear in driving relation with said input shaft and for releasing it therefrom, and
a second clutch for placing said reaction shaft in driving relation with said first planet carrier.

34. The hydromechanical transmission of claim 32 wherein
said reduction planetary train has a fourth set of planet gears, a fourth sun gear lock to said second planet carrier, and a fourth ring gear, and
means for locking said fourth ring gear to said stationary housing.

35. The hydromechanical transmission of claim 31 having hydrostatic start and reverse means comprising:
a drive gear in said drive transmitting means driving said first planet carrier,
a first clutch for placing said drive gear in driving relation with said input shaft and for releasing it therefrom,
said drive gear having an extension,
an idler gear around said extension, and meshed to gear means on said auxiliary shaft, and
a second clutch for connecting said idler gear to the extension of said drive gear.

36. The hydromechanical transmission of claim 31 wherein said planetary assembly and said output and reaction shafts are coaxial.

37. The hydromechanical transmission of claim 36 wherein said input and output shafts are coaxial.

38. A hydromechanical transmission, including in combination:
a driving shaft,
a first intermediate shaft coaxial with said driving shaft,
a second intermediate shaft coaxial with said first intermediate shaft,
an output shaft coaxial with said second intermediate shaft,
first clutch means for releasably clutching said driving shaft to said first intermediate shaft,
second clutch means for releasably clutching said first intermediate shaft to said second intermediate shaft,
third clutch means for releasably clutching said second intermediate shaft to said output shaft,
a stationary casing,
a first planetary gear assembly having a first sun gear mounted on said first intermediate shaft, a first ring gear secured to said casing, a first planet carrier and a first set of planet gears in mesh with said first sun gear and with said first ring gear, a first hollow shaft concentric with a portion of said second intermediate shaft and drivingly connected to said first carrier, a second planetary gear assembly having a second sun gear secured to said second intermediate shaft, a second planet carrier secured to said first hollow shaft, second and third sets of planet gears carried by said carrier with each gear of said second in mesh with a gear of said third set, said second set of planet gears being in mesh with said second sun gear, and a third sun gear in mesh with said third set of planet gears, a second hollow shaft concentric with said first hollow shaft and secured to said third sun gear, a third planetary assembly having a fourth sun gear mounted on and secured to said second hollow shaft, a second ring gear secured to said second planet carrier, a third planet carrier, and a fourth set of planet gears in mesh with said fourth sun gear and said second ring gear, fourth clutch means for releasably clutching said third planet carrier to said output shaft, and speed-varying means for causing said second intermediate shaft to increase its speed and for simultaneously causing said third planet carrier to decrease its speed and vice versa.

39. The transmission of claim 38 wherein said speed-varying means comprises a pair of hydraulic units hydraulically interconnected so that one serves as a pump while the other serves as a motor and vice versa, a first said unit being connected in driving relation with said driving shaft, a second said unit being connected in driving relation with said second hollow shaft.

40. The transmission of claim 39 wherein said first unit is variable in stroke and runs during operation at a constant speed while said second unit is fixed in stroke and variable in speed.

41. The transmission of claim 39 having a first gear secured to said driving shaft, a second gear in driving relation with said first unit and in mesh with said first gear, a third gear secured to said second hollow shaft, and a fourth gear in driving relation with said second unit and in mesh with said third gear.

42. A hydromechanical transmission, including in combination
a planetary assembly having
a first sun gear serving as a reaction member,
a first ring gear serving as a first output member,
a first planet carrier serving as the input member and carrying a first set of planet gears meshed with both said first sun gear and said first ring gear,
a second sun gear serving as a reaction member,
a second ring gear serving as an input member, and splined to said first planet carrier.
a second planet carrier serving as a second output member and carrying a second set of planet gears meshed with both said second sun gear and said second ring gear,
a common reaction shaft to which both said first and second sun gears are secured,
an input shaft,
clutching means for connecting said input shaft to said first planet carrier,
an output shaft, a pair of synchronous clutch means for connecting, during a first hydromechanical speed range, said planet carrier to said output shaft and, during a second hydromechanical speed range, said first ring gear to said output shaft, with over lap at the shift point between said first and second speed ranges, a variable-displacement hydraulic unit driven mechanically by said input shaft, a fixed-displacement hydraulic unit, driven hydraulically by said variable-displacement hydraulic unit and having an auxiliary shaft, and gear means for connecting said auxiliary shaft of said fixed-displacement hydraulic unit to said reaction shaft.

43. The hydromechanical transmission of claim 42 wherein the said first and second sun gears are identical, said first and second ring gears are identical, said first and second planet carriers are identical, and said first and second sets of planet gears are identical.

44. The hydromechanical transmission of claim 43 wherein said first and second sun gears are part of a single elongated gear.

45. A hydromechanical transmission, including in combination a first planetary assembly having a first sun gear serving as a reaction member, a first ring gear serving as a first output member, a first planet carrier serving as the input member and carrying a first set of planet gears meshed with both said first sun gear and said first ring gear, a second sun gear serving as a reaction member, a second ring gear serving as an input member, and splined to said first planet carrier, a second planet carrier serving as a second output member and carrying a second set of planet gears meshed with both said second sun gear and said second ring gear, a common reaction shaft to which both said first and second sun gears are secured, a second planetary assembly having a third sun gear serving as an input member and connected to said first ring gear, a third ring gear serving as a reaction member, a third planet carrier serving as a third output member and carrying a third set of planet gears meshed with both said sun gear and said third ring gear, a stationary housing, an input shaft, clutching means for connecting said input shaft to said first planet carrier, an output shaft connected to said third planet carrier, a pair of synchronous clutch means for connecting, during a first hydromechanical speed range, said third ring gear to said stationary housing, and, during a second hydromechanical speed range, said second planet carrier to said third planet carrier and thereby to said output shaft, with over lap at the shift point between said first and second speed ranges, a variable-displacement hydraulic unit driven mechanically by said input shaft, a fixed-displacement hydraulic unit, driven hydraulically by said variable-displacement hydraulic unit and having an auxiliary shaft, and gear means connecting said auxiliary shaft of said fixed-displacement hydraulic unit to said reaction shaft.

46. The hydromechanical transmission of claim 45 wherein the said first and second sun gears are identical, said first and second ring gears are identical, and said first and second sets of planet gears are identical.

47. The hydromechanical transmission of claim 46 wherein said first and second sun gears are part of a single elongated gear.

48. The hydromechanical transmission of claim 45 wherein said first, second and third sun gears are identical, said first, second, and third ring gears are identical, and said first, second, and third sets of planet gears are identical.

49. The hydromechanical transmission of claim 48 wherein there is a third hydraulic unit, variable in displacement, hydraulically connected to said earlier-named variable-displacement hydraulic unit, and means for clutching said third unit to said auxiliary shaft of said fixed-displacement hydraulic unit.

* * * * *